US012659108B2

(12) United States Patent
Manolakos et al.

(10) Patent No.: US 12,659,108 B2
(45) Date of Patent: Jun. 16, 2026

(54) DOWNLINK CONTROL INFORMATION (DCI)-BASED TRIGGERED POSITIONING REFERENCE SIGNALS (PRS)

(71) Applicant: QUALCOMM Incorporated, San Diego, CA (US)

(72) Inventors: Alexandros Manolakos, Escondido, CA (US); Weimin Duan, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 835 days.

(21) Appl. No.: 17/758,622

(22) PCT Filed: Nov. 23, 2020

(86) PCT No.: PCT/US2020/061833
§ 371 (c)(1),
(2) Date: Jul. 11, 2022

(87) PCT Pub. No.: WO2021/154373
PCT Pub. Date: Aug. 5, 2021

(65) Prior Publication Data
US 2023/0047646 A1 Feb. 16, 2023

(30) Foreign Application Priority Data

Jan. 29, 2020 (GR) ............................... 20200100040

(51) Int. Cl.
*H04L 5/00* (2006.01)
(52) U.S. Cl.
CPC .......... *H04L 5/0051* (2013.01); *H04L 5/0016* (2013.01)
(58) Field of Classification Search
None
See application file for complete search history.

(56) References Cited

U.S. PATENT DOCUMENTS 8,712,401 B2 4/2014 Yoo et al.
9,338,591 B1 * 5/2016 Vivanco ............ H04W 36/0088
(Continued)

FOREIGN PATENT DOCUMENTS

CN 102170610 A * 8/2011
CN 105050122 A * 11/2015 ........ H04W 52/0206
(Continued)

OTHER PUBLICATIONS

CMCC: "Consideration on MAC CE Design for Single PDCCH Based Multi-TRP Transmission", 3GPP Draft, 3GPP TSG-RAN WG2 Meeting #107Bis, R2-1913171, Consideration on MAC CE Design for Single PDCCH Based Multi-TRP Transmission, 3rd Generation Partnership Project (3GPP), Mobile Competence Centre, 650, Route Des Lucioles, vol. RAN WG2. No. Chongqing, China, Oct. 14, 2019-Oct. 18, 2019, Oct. 4, 2019 (Oct. 4, 2019), XP051804878, 6 Pages, Retrieved from the Internet: URL: https://ftp.3gpp.org/tsg_ran/WG2_RL2/TSGR2_107bis/Docs/R2-1913171.zip. R2-1913171, Consideration on MAC CE Design for Single PDCCH Based Multi-TRP Panel Transmission.doc [retrieved on Oct. 4, 2019] section 1.

(Continued)

*Primary Examiner* — Andrew C Oh
(74) *Attorney, Agent, or Firm* — QUALCOMM Incorporated

(57) ABSTRACT

Disclosed are techniques for wireless communication. In an aspect, a user equipment (UE) receives, from a serving transmission-reception point (TRP), downlink control information (DCI) triggering the UE to measure positioning reference signals (PRS), wherein a code point in the DCI is associated with one or more PRS resources, one or more PRS resource sets, one or more positioning frequency layers, or one or more TRPs, and measures PRS transmitted on the one or more PRS resources, the one or more PRS resource (Continued)

sets, the one or more positioning frequency layers, or the one or more TRPs.

35 Claims, 11 Drawing Sheets

(56) References Cited

U.S. PATENT DOCUMENTS

| | | | | |
|---|---|---|---|---|
| 2010/0317343 A1* | 12/2010 | Krishnamurthy ... | H04W 72/044 | 455/435.1 |
| 2012/0195286 A1* | 8/2012 | Kim ...................... | H04L 5/0048 | 370/329 |
| 2013/0267246 A1* | 10/2013 | Wang ................... | H04W 24/00 | 455/456.1 |
| 2017/0111880 A1 | 4/2017 | Park et al. | | |
| 2018/0007576 A1 | 1/2018 | Lee et al. | | |
| 2018/0007731 A1* | 1/2018 | Park ........................ | H04L 5/001 | |
| 2018/0054792 A1* | 2/2018 | Lee ......................... | H04B 17/24 | |
| 2018/0324619 A1* | 11/2018 | Harada ................. | H04W 24/10 | |
| 2019/0037338 A1* | 1/2019 | Edge ....................... | H04W 4/02 | |
| 2019/0052432 A1* | 2/2019 | Islam .................... | H04L 5/0053 | |
| 2019/0297489 A1* | 9/2019 | Lei ......................... | H04L 5/0051 | |
| 2019/0342801 A1* | 11/2019 | Cui ........................ | H04W 72/23 | |
| 2020/0229126 A1* | 7/2020 | Soriaga ............... | H04W 64/003 | |
| 2020/0235877 A1* | 7/2020 | Manolakos ........... | H04L 5/0048 | |
| 2021/0112522 A1* | 4/2021 | Kim ...................... | H04W 64/00 | |

FOREIGN PATENT DOCUMENTS

| | | | | | |
|---|---|---|---|---|---|
| CN | 113194531 A | * | 7/2021 | .......... | G01S 5/0244 |
| CN | 113273102 A | * | 8/2021 | ......... | H04B 7/06956 |
| WO | WO-2011130665 | | 10/2011 | | |
| WO | WO-2015199392 A1 | * | 12/2015 | ........... | H04W 64/00 |
| WO | WO-2020091545 A1 | * | 5/2020 | ........... | H04W 72/51 |
| WO | WO-2020145700 A1 | * | 7/2020 | ......... | H04W 64/006 |
| WO | WO-2020145727 A1 | * | 7/2020 | ........... | H04L 5/0051 |
| WO | WO-2020145739 A1 | * | 7/2020 | ........... | H04W 72/30 |

OTHER PUBLICATIONS

Huawei, et al., "DL RS Design for NR Positioning", 3GPP Draft, 3GPP TSG RAN WG1 #97, R1-1906052, 3rd Generation Partnership Project (3GPP), Mobile Competence Centre, 650, Route Des Lucioles, F-06921 Sophia-Antipolis Cedex, France, vol. RAN WG1, No. Reno. USA, May 13, 2019-May 17, 2019, May 13, 2019 (May 13, 2019), XP051727509, 7 pages, Retrieved from the Internet: URL: http://www.3gpp.org/ftp/Meetings%5F3GPP%5FSYNC/RAN1/ Docs/R1%2D1906052%2Ezip. [retrieved on May 13, 2019] Section 2.6.

International Search Report and Written Opinion—PCT/US2020/ 061833—ISA/EPO—Jun. 21, 2021.

Qualcomm Incorporated: "DL and UL NR Positioning Procedures", 3GPP Draft, 3GPP TSG-RAN WG2 Meeting #107bis, R2-1913395 (Positioning Procedures + Draft LPP CR), 3rd Generation Partnership Project (3GPP), Mobile Competence Centre, 650, Route Des Lucioles, F-06921 Sophia-Antipolis Cedex, France, vol. RAN WG2, No. Chongqing, China, Oct. 14, 2019-Oct. 18, 2019, Oct. 4, 2019 (Oct. 4, 2019), pp. 1-53, XP051804974, XP051791399, Retrieved from the Internet: URL: https://ftp.3gpp.org/tsg_ran/WG2_RL2/ TSGR2_107bis/Docs/R2-1913395.zip. R2-1913395_(Positioning Procedures + Draft LPP CR).docx [retrieved on Oct. 4, 2019] Par. 3 p. 5. lines 4-5 p. 6. line 11—p. 7. line 2 p. 7. lines 8-20 figure 4, p. 16, paragraph 3.2, Section 3 figure 1.

Intel Corporation: "Resolution of Remaining Opens for NR Positioning DL PRS Design", R1-1912228, 3GPP TSG RAN WG1 Meeting#99 Reno, USA, Nov. 18-22, 2019, pp. 1-26.

Nokia: "Introduction of NR Positioning Support ", R1-1913662, 3GPP TSG-RAN WG1 Meeting #99 Reno, USA, Nov. 18-22, 2019, 9 Pages.

Qualcomm Inc: "Remaining Details on UE & gNB Measurements for NR Positioning", R1-1912975, 3GPP TSG RAN WG1 #98 Chongqing, China, Oct. 14-18, 2019, pp. 1-12.

Taiwan Search Report—TW109141154—TIPO—May 16, 2024.

* cited by examiner

250

270

272

LMF

SLP

260

5GC

266

264

AMF

SMF

UPF

262

265

265

263

263

220

NEW RAN

224 ng-eNB gNB

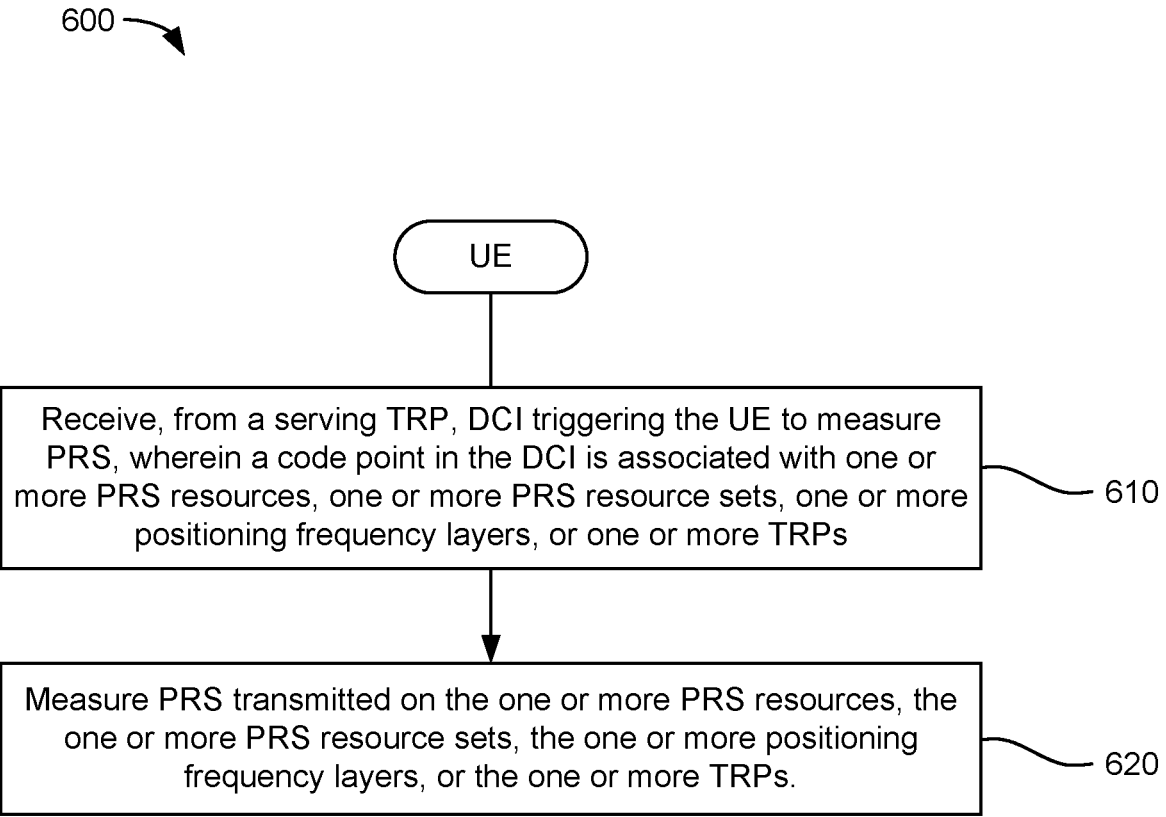

UE

Receive, from a serving TRP, DCI triggering the UE to measure PRS, wherein a code point in the DCI is associated with one or more PRS resources, one or more PRS resource sets, one or more positioning frequency layers, or one or more TRPs ⟋ 610

Measure PRS transmitted on the one or more PRS resources, the one or more PRS resource sets, the one or more positioning frequency layers, or the one or more TRPs. ⟋ 620

DOWNLINK CONTROL INFORMATION (DCI)-BASED TRIGGERED POSITIONING REFERENCE SIGNALS (PRS)

CROSS-REFERENCE TO RELATED APPLICATIONS

The present Application for Patent claims priority under 35 U.S.C. § 371 to International Application No. PCT/US2020/061833, entitled "DOWNLINK CONTROL INFORMATION (DCI)-BASED TRIGGERED POSITIONING REFERENCE SIGNALS (PRS)," filed Nov. 23, 2020, which claims priority under 35 U.S.C. § 119 to Greek Patent Application No. 20200100040, entitled "DOWNLINK CONTROL INFORMATION (DCI)-BASED TRIGGERED POSITIONING REFERENCE SIGNALS (PRS)," filed Jan. 29, 2020, each of which is assigned to the assignee hereof and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the follow-ing summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) includes receiving, from a serving transmission-reception point (TRP), downlink control information triggering the UE to measure positioning reference signals (PRS), wherein a code point in the DCI is associated with one or more PRS resources, one or more PRS resource sets, one or more positioning frequency layers, or one or more TRPs, and measuring PRS transmitted on the one or more PRS resources, the one or more PRS resource sets, the one or more positioning frequency layers, or the one or more TRPs.

In an aspect, a method of wireless communication performed by a TRP includes transmitting, to a UE, downlink control information triggering the UE to measure positioning reference signals (PRS), wherein a code point in the DCI is associated with one or more PRS resources, one or more PRS resource sets, one or more positioning frequency layers, or one or more TRPs, and transmitting the PRS on the one or more PRS resources, the one or more PRS resource sets, the one or more positioning frequency layers, or the one or more TRPs.

In an aspect, a UE includes a memory, at least one transceiver, and at least one processor communicatively coupled to the memory and the at least one transceiver, the at least one processor configured to receive, from a serving TRP via the at least one transceiver, DCI triggering the UE to measure PRS, wherein a code point in the DCI is associated with one or more PRS resources, one or more PRS resource sets, one or more positioning frequency layers, or one or more TRPs, and measure PRS transmitted on the one or more PRS resources, the one or more PRS resource sets, the one or more positioning frequency layers, or the one or more TRPs.

In an aspect, a base station includes a memory, at least one transceiver, and at least one processor communicatively coupled to the memory and the at least one transceiver, the at least one processor configured to cause the at least one transceiver to transmit, to a UE, DCI triggering the UE to measure PRS, wherein a code point in the DCI is associated with one or more PRS resources, one or more PRS resource sets, one or more positioning frequency layers, or one or more TRPs, and cause the at least one transceiver to transmit the PRS on the one or more PRS resources, the one or more PRS resource sets, the one or more positioning frequency layers, or the one or more TRPs.

In an aspect, a UE includes means for receiving, from a serving TRP, DCI triggering the UE to measure PRS, wherein a code point in the DCI is associated with one or more PRS resources, one or more PRS resource sets, one or more positioning frequency layers, or one or more TRPs, and means for measuring PRS transmitted on the one or more PRS resources, the one or more PRS resource sets, the one or more positioning frequency layers, or the one or more TRPs.

In an aspect, a base station includes means for transmitting, to a UE, DCI triggering the UE to measure PRS, wherein a code point in the DCI is associated with one or more PRS resources, one or more PRS resource sets, one or more positioning frequency layers, or one or more TRPs, and means for transmitting the PRS on the one or more PRS resources, the one or more PRS resource sets, the one or more positioning frequency layers, or the one or more TRPs.

In an aspect, a non-transitory computer-readable medium storing computer-executable instructions includes computer-executable instructions comprising at least one instruction instructing a UE to receive, from a serving TRP, DCI triggering the UE to measure PRS, wherein a code point in the DCI is associated with one or more PRS resources, one or more PRS resource sets, one or more positioning frequency layers, or one or more TRPs, and at least one instruction instructing the UE to measure PRS transmitted on the one or more PRS resources, the one or more PRS resource sets, the one or more positioning frequency layers, or the one or more TRPs.

In an aspect, a non-transitory computer-readable medium storing computer-executable instructions includes computer-executable instructions comprising at least one instruction instructing a TRP to transmit, to a UE, DCI triggering the UE to measure PRS, wherein a code point in the DCI is associated with one or more PRS resources, one or more PRS resource sets, one or more positioning frequency layers, or one or more TRPs, and at least one instruction instructing the TRP to transmit the PRS on the one or more PRS resources, the one or more PRS resource sets, the one or more positioning frequency layers, or the one or more TRPs.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIGS. 2A and 2B illustrate example wireless network structures, according to various aspects of the disclosure.

FIGS. 6 and 7 illustrate example methods of wireless communication, according to aspects of the disclosure.

DETAILED DESCRIPTION

Figure 1:
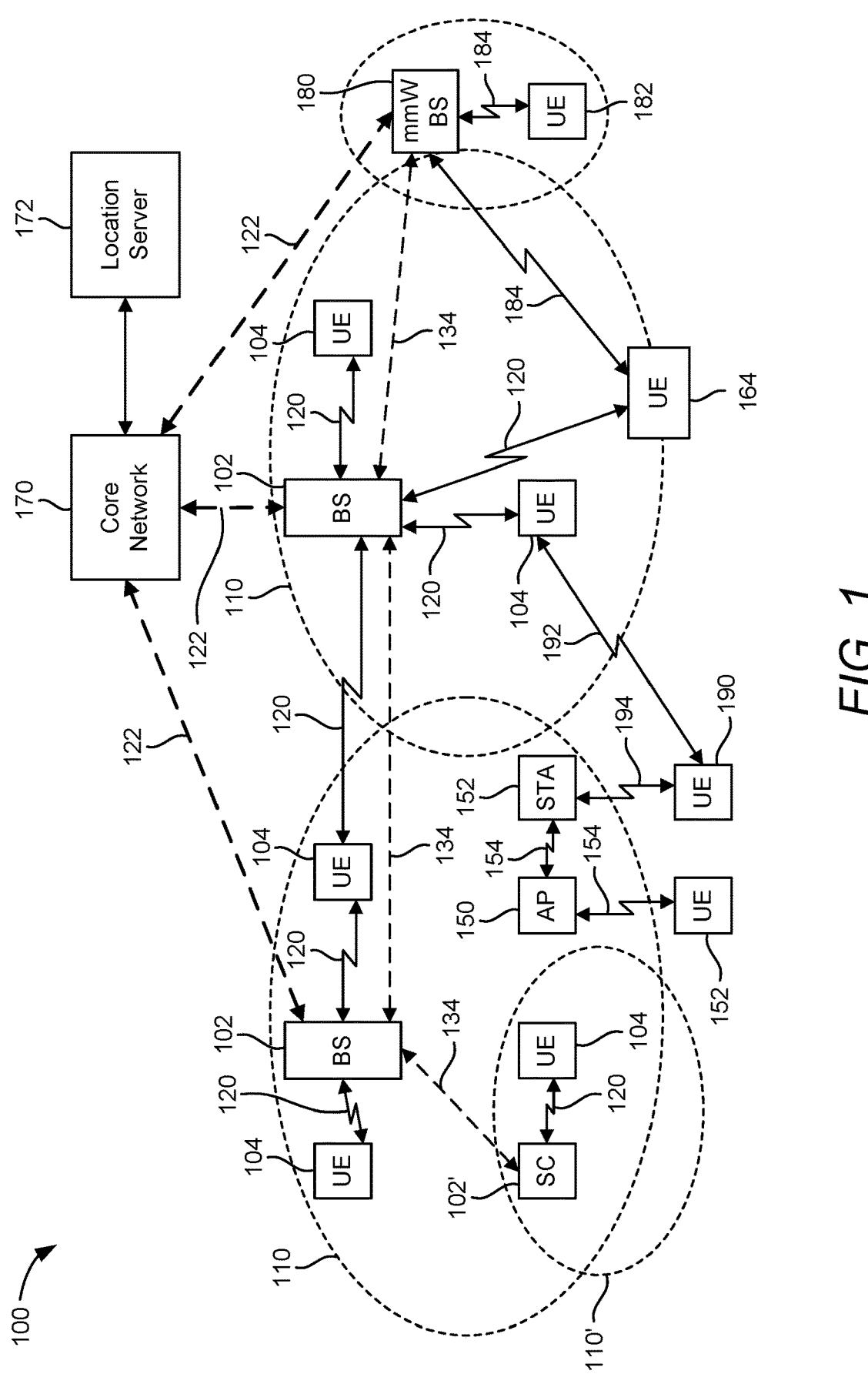
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
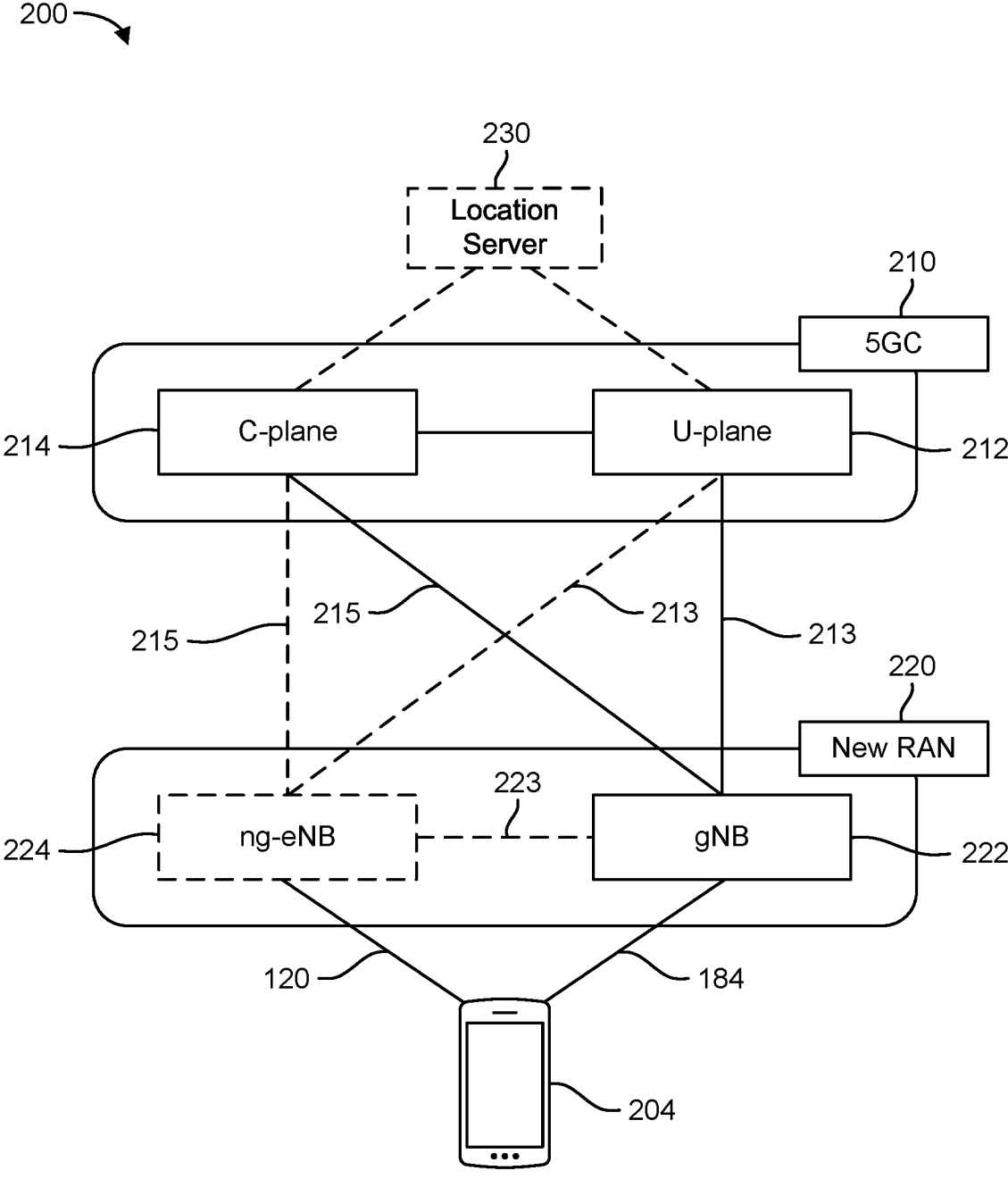

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
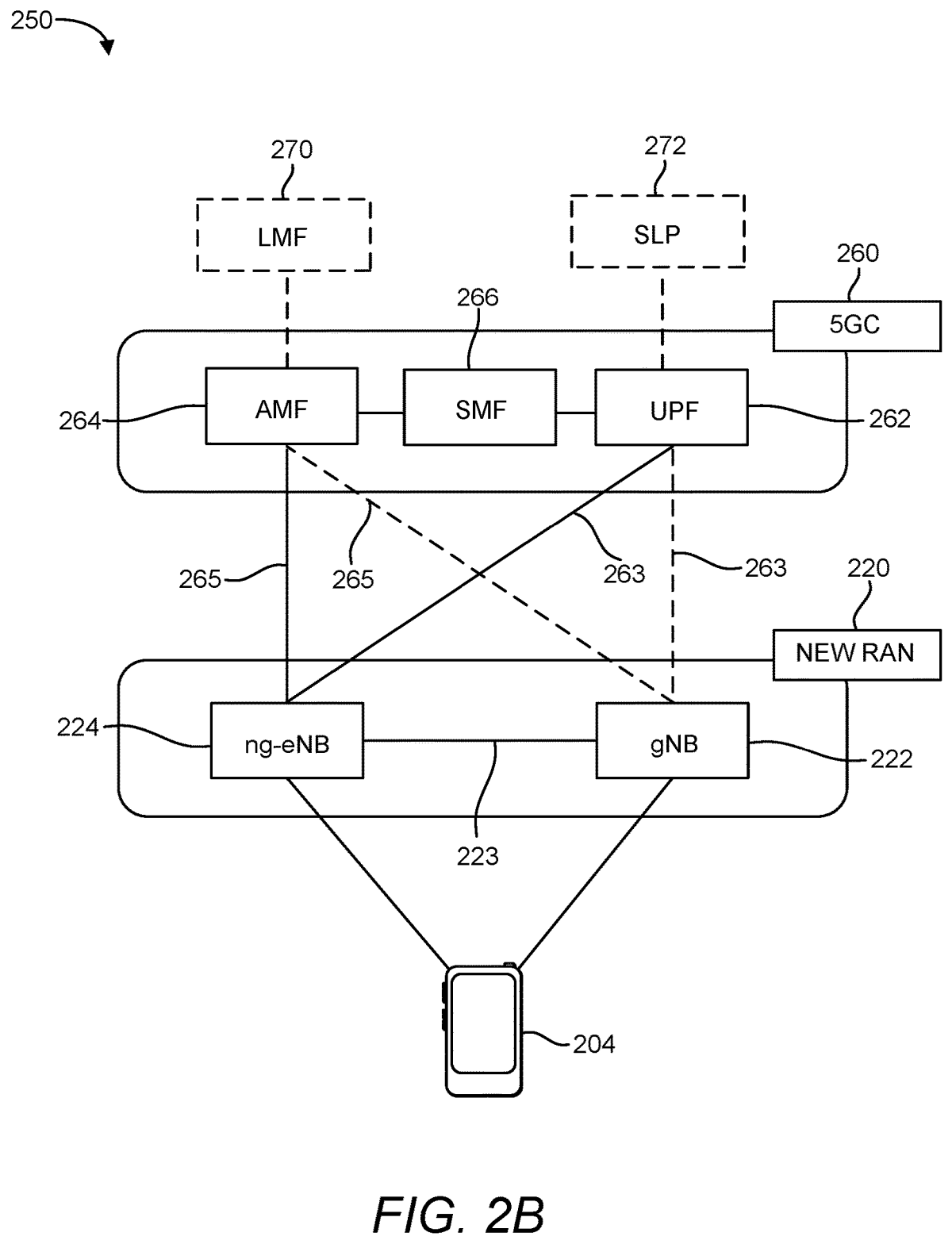

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 164 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 270 may communicate with UEs 204 and external clients (not shown in FIG. 2B) over a user plane (e.g., using protocols intended to carry voice and/or data like the transmission control protocol (TCP) and/or IP).

Figure 3A:
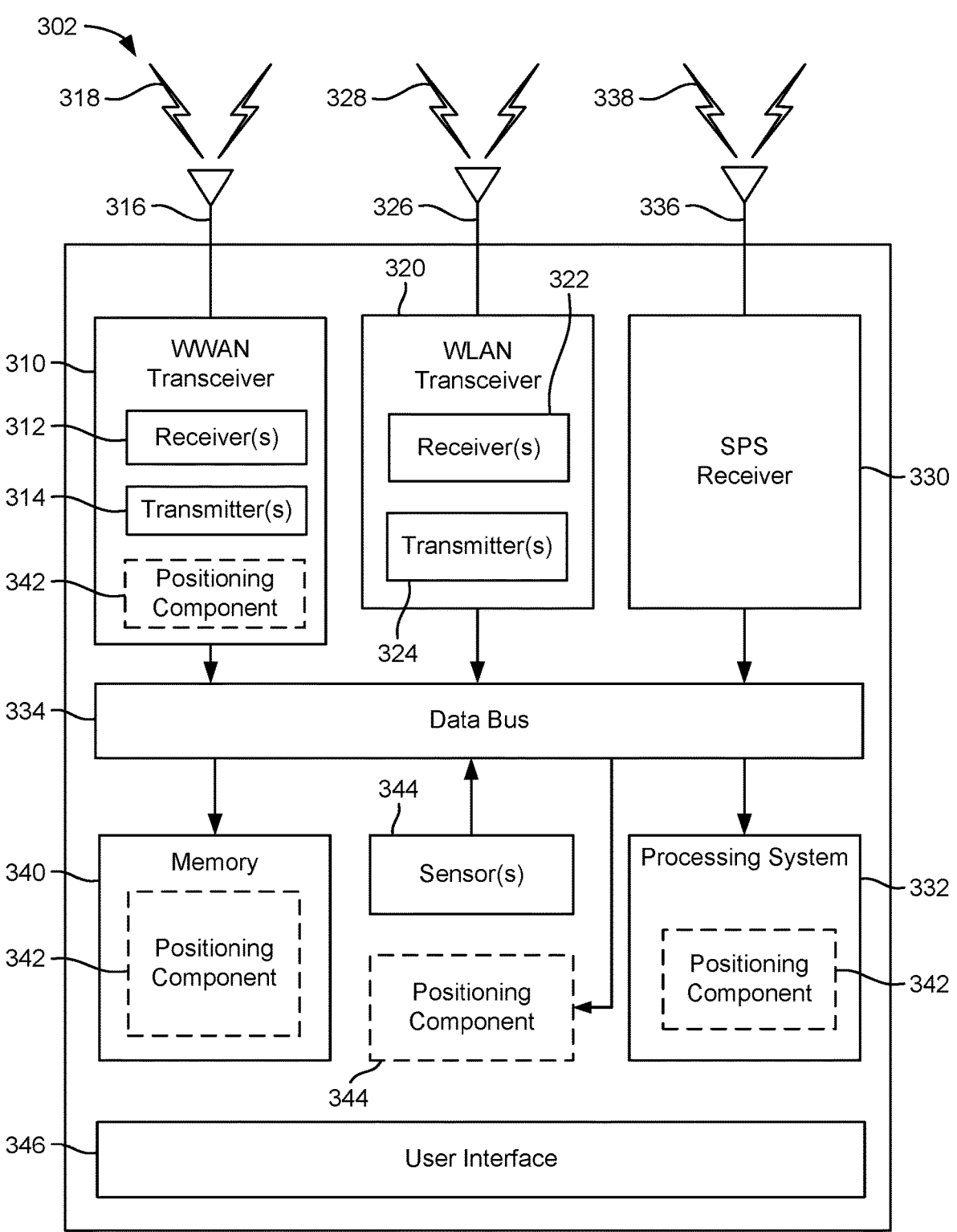
FIGS. 3A to 3C are simplified block diagrams of several sample aspects of components that may be employed in a user equipment (UE), a base station, and a network entity, respectively, and configured to support communications as taught herein.
Figure 3B:
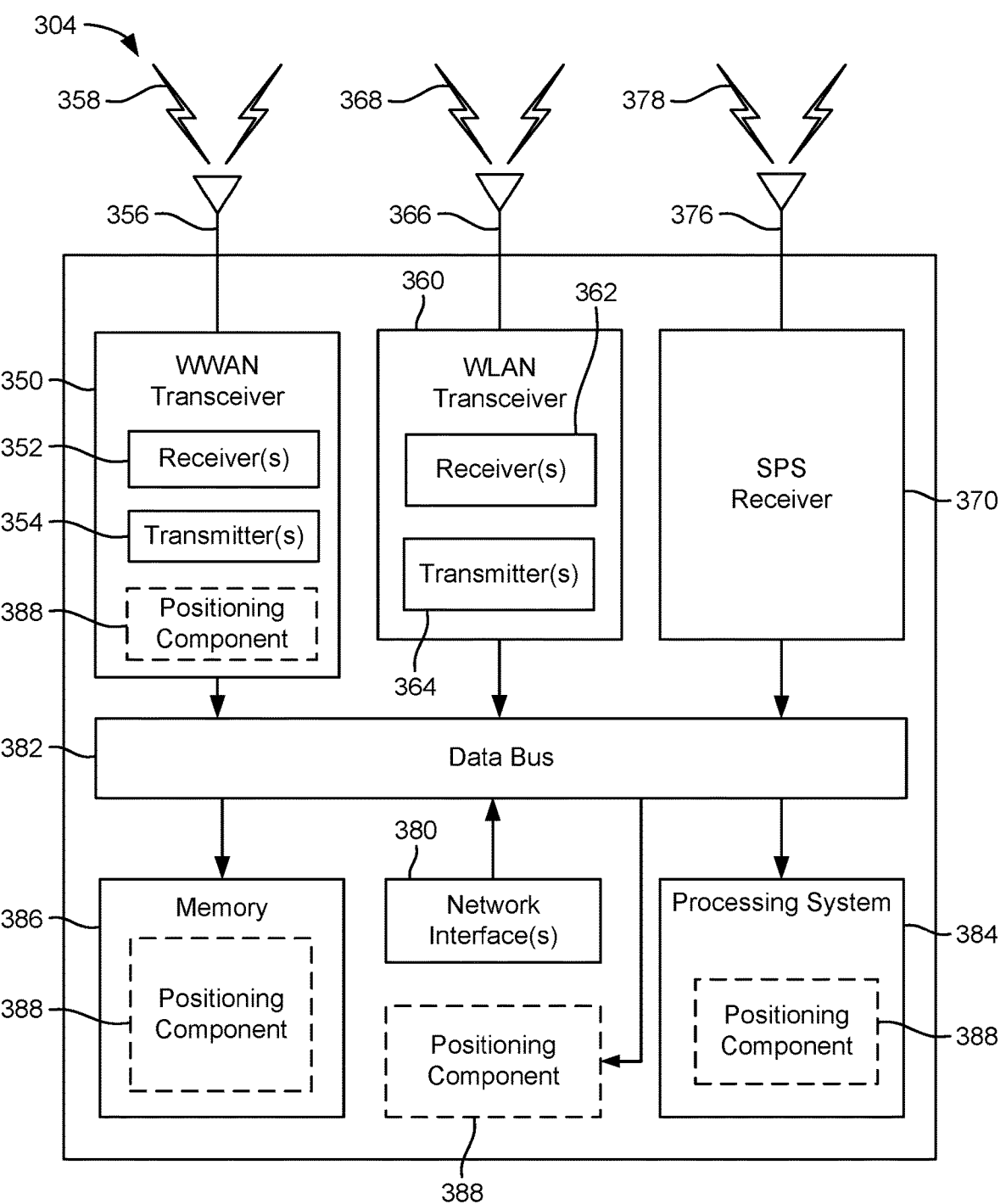
Figure 3C:
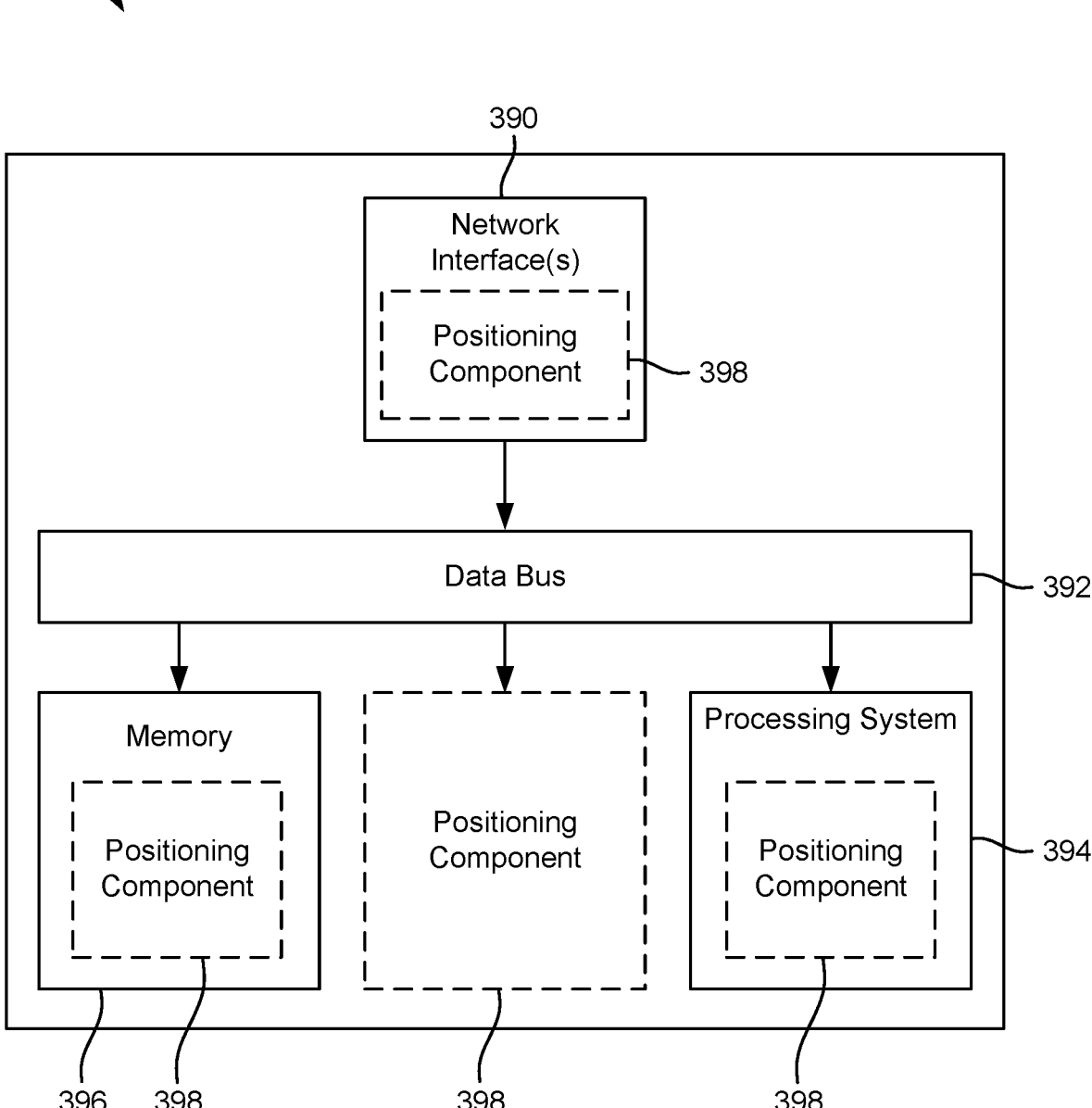

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless communication, and for providing other processing functionality. The base station 304 includes a processing system 384 for providing functionality relating to, for example, wireless communication as disclosed herein, and for providing other processing functionality. The network entity 306 includes a processing system 394 for providing functionality relating to, for example, wireless communication as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
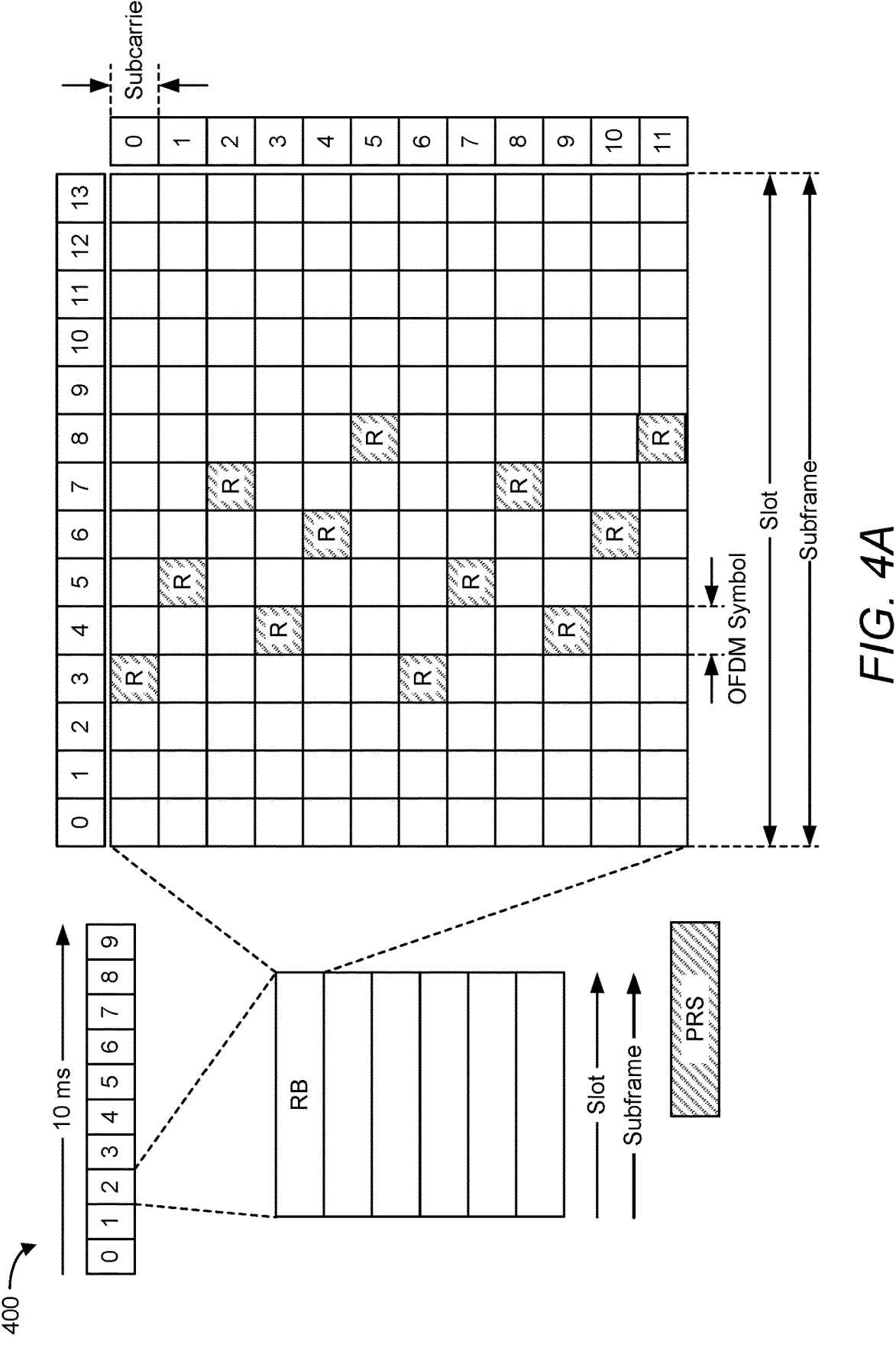
FIGS. 4A and 4B are diagrams illustrating examples of frame structures and channels within the frame structures, according to aspects of the disclosure.
Figure 4B:
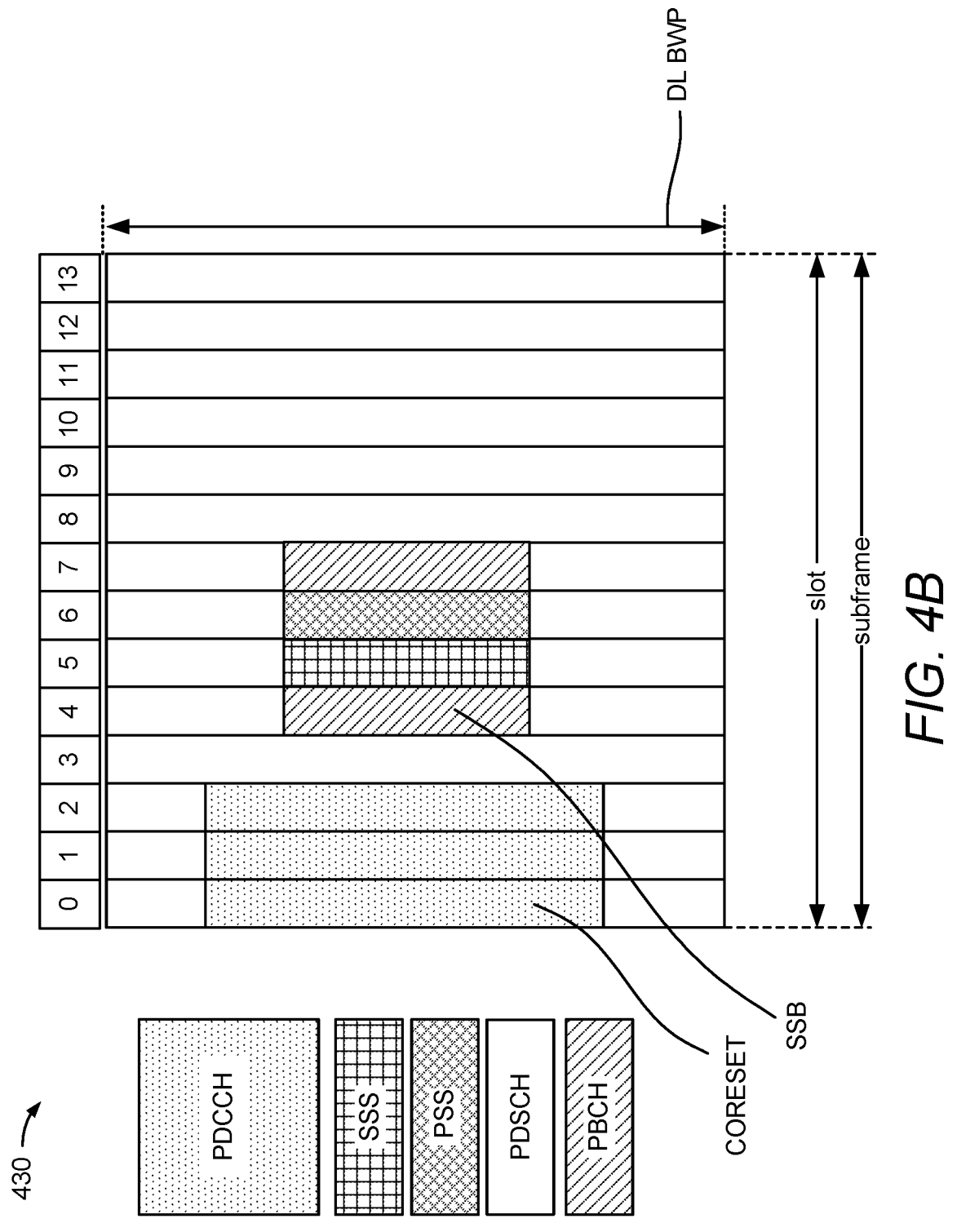

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies ($\mu$), for example, subcarrier spacing of 15 kHz, 30 kHz, 60 kHz, 120 kHz, and 240 kHz or greater may be available. Table 1 provided below lists some various parameters for different NR numerologies.

TABLE 1

| $\mu$ | SCS (kHz) | Symbols/ Sot | Slots/ Subframe | Slots/ Frame | Slot Duration (ms) | Symbol Duration ($\mu$s) | Max. nominal system BW (MHz) with 4K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the examples of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu = 0$, 1, 2, 3. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

The parameters defining each PRS resource are configured to a UE via the higher layer (e.g., LPP) parameters DL-PRS-PositioningFrequencyLayer, DL-PRS-ResourceSet, and DL-PRS-Resource. A positioning frequency layer is defined by the parameters DL-PRS-SubcarrierSpacing, DL-PRS-CyclicPrefix, and DL-PRS-PointA. The parameter DL-PRS-SubcarrierSpacing defines the subcarrier spacing for the PRS resource. All PRS resources and PRS resource sets in the same DL-PRS-PositioningFrequencyLayer have the same value of DL-PRS-SubcarrierSpacing. The supported values of DL-PRS-SubcarrierSpacing are given in Table 2 below.

TABLE 2

| μ | $\Delta f = 2^\mu \cdot 15$ [kHz] | Cyclic prefix |
| --- | --- | --- |
| 0 | 15 | Normal |
| 1 | 30 | Normal |
| 2 | 60 | Normal, Extended |
| 3 | 120 | Normal |
| 4 | 240 | Normal |

The parameter DL-PRS-CyclicPrefix defines the cyclic prefix for the PRS resource. All PRS resources and PRS resource sets in the same DL-PRS-PositioningFrequency-Layer have the same value of DL-PRS-CyclicPrefix. The supported values of DL-PRS-CyclicPrefix are given in Table 2 above.

The parameter DL-PRS-PointA defines the absolute frequency of the reference resource block (RB). Its lowest subcarrier is also known as Point A. All PRS resources belonging to the same PRS resource set have a common Point A and all PRS resources sets belonging to the same DL-PRS-PositioningFrequencyLayer have a common Point A.

A PRS resource is described by at least the following higher layer parameters: DL-PRS-ResourceList, DL-PRS-ResourceId, DL-PRS-SequenceId, DL-PRS-ReOffset, DL-PRS-ResourceSlotOffset, DL-PRS-ResourceSymbolOffset, DL-PRS-NumSymbols, DL-PRS-QCL-Info, and DL-PRS-StartPRB. The parameter DL-PRS-ResourceList determines the PRS resources that are contained within one PRS resource set. The parameter DL-PRS-ResourceId determines the PRS resource configuration identity. All PRS resource identifiers are locally defined within a PRS resource set. The parameter DL-PRS-SequenceId is used to initialize the $c_{init}$ value used in the pseudo random generator for the generation of the PRS sequence for a given PRS resource.

The parameter DL-PRS-ReOffset defines the starting RE offset of the first symbol within a PRS resource in frequency. The relative RE offsets of the remaining symbols within a PRS resource are defined based on the initial offset and the rule(s) described in section 7.4.1.7.3 of 3GPP Technical Specification (TS) 38.211, which is publicly available and incorporated by reference herein in its entirety. The parameter DL-PRS-ResourceSlotOffset determines the starting slot of the PRS resource with respect to the corresponding DL-PRS-ResourceSetSlotOffset parameter. The parameter DL-PRS-ResourceSymbolOffset determines the starting symbol of the PRS resource within the starting slot. The parameter DL-PRS-NumSymbols defines the number of symbols of the PRS resource within a slot, where the allowable values are given in section 7.4.1.7.1 of 3GPP TS 38.211.

The parameter DL-PRS-QCL-Info defines any QCL information of the PRS resource with other reference signals. The PRS may be configured to be "QCL-Type-D" with a PRS or SS/PBCH block (see FIG. 4B) from a serving cell or a non-serving cell. The PRS may be configured to be "QCL-Type-C" with an SS/PBCH block from a serving or non-serving cell. If the PRS is configured as both "QCL-Type-C" and "QCL-Type-D" with an SS/PBCH block, then the SSB index indicated is expected to be the same.

The parameter DL-PRS-StartPRB defines the starting PRB index of the PRS resource with respect to the reference Point A. The starting PRB index has a granularity of one PRB with a minimum value of '0' and a maximum value of '2176' PRBs. All PRS resource sets belonging to the same positioning frequency layer have the same value of DL-PRS-StartPRB.

A UE may be configured with an identifier, referred to herein as a TRP-to-PRS resource set identifier or a PRS-ID, that is defined such that it is associated with multiple PRS resource sets from the same cell/TRP. For example, a PRS-ID may be a cell ID (e.g., PCI, VCI), or a TRP ID, or another identifier that is different than the cell ID or the TRP ID that is used for positioning purposes to participate in the unique identification of a PRS resource. Thus, the combination of the following three identifiers uniquely identifies a PRS resource across all PRS resource sets and all TRPs from which a UE is receiving/measuring PRS: (1) PRS-ID, (2) DL-PRS-ResourceSetId, and (3) DL-PRS-ResourceId.

Note that the terms "positioning reference signal" and "PRS" generally refer to specific downlink reference signals that are used for positioning in LTE and NR systems. However, as used herein, the terms "positioning reference signal" and "PRS" may also refer to any type of downlink or uplink reference signal that can be used for positioning, such as but not limited to, PRS as defined in LTE and NR, TRS, PTRS, CRS, CSI-RS, DMRS, PSS, SSS, SSB, PDSCH, PDCCH, SRS, UL-PRS, etc. If needed for clarity, for signals that may be transmitted in both the uplink and downlink (e.g., PRS, DMRS, PTRS), the signals may be prepended with "UL" or "DL" to distinguish the direction. For example, "UL-DMRS" may be used to differentiate from "DL-DMRS."

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH block). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., PUSCH). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc., as shown in Table 3 below. A PDCCH may be transported by 1, 2, 4, 8, or 16 CCEs in order to accommodate different DCI payload sizes or coding rates.

TABLE 3

| DCI Format | Usage |
| --- | --- |
| Format 0-0 | Fallback for scheduling of PUSCH |
| Format 0-1 | Non-fallback for scheduling of PUSCH |
| Format 1-0 | Fallback for scheduling of PDSCH |
| Format 1-1 | Non-fallback for scheduling of PDSCH |
| Format 2-0 | Notifying a group of UEs of the slot format |
| Format 2-1 | Notifying a group of UEs of the PRB(s) and OFDM symbol(s) where UE may assume no transmission is intended for the UE |

TABLE 3-continued

| DCI Format | Usage |
|---|---|
| Format 2-2 | Transmission of TPC commands for PUCCH and PUSCH |
| Format 2-3 | Transmission of a group of SRS requests and TPC commands for SRS transmissions |

In Table 3, a fallback format is a default scheduling option that has non-configurable fields and supports basic NR operations. In contrast, a non-fallback format is flexible to accommodate NR features.

As will be appreciated, a UE needs to be able to demodulate (also referred to as decoding) the PDCCH in order to read the DCI, and thereby to obtain the scheduling of resources allocated to the UE on the PDSCH and PUSCH. If the UE fails to demodulate the PDCCH, then the UE will not know the locations of the PDSCH resources and it will keep attempting to demodulate the PDCCH using a different set of PDCCH candidates in subsequent PDCCH monitoring occasions. If the UE fails to demodulate the PDCCH after some number of attempts, the UE declares a radio link failure (RLF). To overcome PDCCH demodulation issues, search spaces are configured for efficient PDCCH detection and demodulation.

Generally, a UE does not attempt to demodulate each and very PDCCH candidate that may be scheduled in a slot. To reduce restrictions on the PDCCH scheduler, and at the same time to reduce the number of blind demodulation attempts by the UE, search spaces are configured. Search spaces are indicated by a set of contiguous CCEs that the UE is supposed to monitor for scheduling assignments/grants relating to a certain component carrier. There are two types of search spaces used for the PDCCH to control each component carrier, a common search space (CSS) and a UE-specific search space (USS).

A common search space is shared across all UEs, and a UE-specific search space is used per UE (i.e., a UE-specific search space is specific to a specific UE). For a common search space, a DCI cyclic redundancy check (CRC) is scrambled with a system information radio network temporary identifier (SI-RNTI), random access RNTI (RA-RNTI), temporary cell RNTI (TC-RNTI), paging RNTI (P-RNTI), interruption RNTI (INT-RNTI), slot format indication RNTI (SFI-RNTI), TPC-PUCCH-RNTI, TPC-PUSCH-RNTI, TPC-SRS-RNTI, cell RNTI (C-RNTI), or configured scheduling RNTI (CS-RNTI) for all common procedures. For a UE-specific search space, a DCI CRC is scrambled with a C-RNTI or CS-RNTI, as these are specifically targeted to individual UE.

A UE demodulates the PDCCH using the four UE-specific search space aggregation levels (1, 2, 4, and 8) and the two common search space aggregation levels (4 and 8), as shown in Table 4 below.

TABLE 4

| Search Space Type | Aggregation Level | Number of PDCCH Candidates per Slot | Size (in CCEs) |
|---|---|---|---|
| UE-Specific Search Space | 1 | 6 | 6 |
| | 2 | 6 | 12 |
| | 4 | 2 | 8 |
| | 8 | 2 | 16 |
| Common Search Space | 4 | 4 | 16 |
| | 8 | 2 | 16 |

Each search space comprises a group of consecutive CCEs that could be allocated to a PDCCH, referred to as a PDCCH candidate. A UE demodulates all of the PDCCH candidates in these two search spaces (USS and CSS) to discover the DCI for that UE. For example, the UE may demodulate the DCI to obtain the scheduled uplink grant information on the PUSCH and the downlink resources on the PDSCH. Note that the aggregation level is the number of REs of a CORESET that carry a PDCCH DCI message, and is expressed in terms of CCEs. There is a one-to-one mapping between the aggregation level and the number of CCEs per aggregation level. That is, for aggregation level '4,' there are four CCEs. Thus, as shown in Table 4, if the aggregation level is '4' and the number of PDCCH candidates in a slot is '2,' then the size of the search space is '8' (i.e., 4×2=8).

Figure 5:
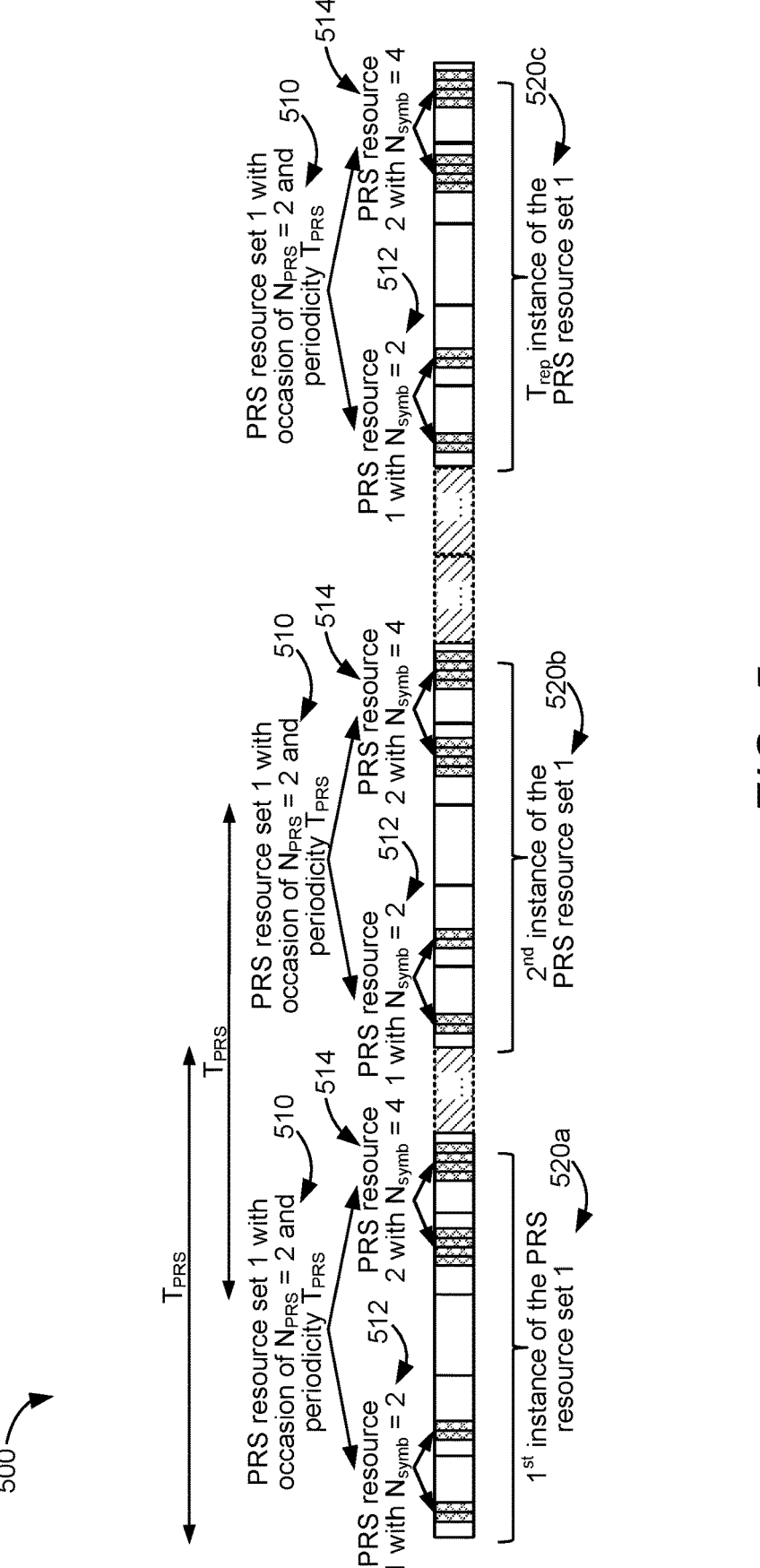
FIG. 5 is a diagram of an example positioning reference signal (PRS) configuration for the PRS transmissions of a given base station, according to aspects of the disclosure.

FIG. 5 is a diagram of an example PRS configuration 500 for the PRS transmissions of a given base station, according to aspects of the disclosure. In FIG. 5, time is represented horizontally, increasing from left to right. Each long rectangle represents a slot and each short (shaded) rectangle represents an OFDM symbol. The PRS configuration 500 identifies the PRS resources 512 and 514 of a PRS resource set 510 during which the base station transmits PRS. The PRS resource set 510 has an occasion length $N_{PRS}$ of two (2) slots and a periodicity of $T_{PRS}$ (e.g., 160 subframes or 160 ms). As such, both the PRS resources 512 and 514 are two consecutive slots in length and repeat every $T_{PRS}$ subframes, starting from the slot in which the first symbol of the respective PRS resource occurs.

In the example of FIG. 5, the PRS resource set 510 includes two PRS resources, a first PRS resource 512 (labeled "PRS resource 1" in FIG. 5) and a second PRS resource 514 (labeled "PRS resource 2" in FIG. 5). The PRS resource 512 and the PRS resource 514 may be transmitted on separate beams of the same base station. The PRS resource 512 has a symbol length $N_{symb}$ of two (2) symbols, and the PRS resource 514 has a symbol length $N_{symb}$ of four (4) symbols.

Each instance of the PRS resource set 510, illustrated as instances 530a, 530b, and 530c, includes an occasion of length '2' (i.e., $N_{PRS}=2$) for each PRS resource 512, 514 of the PRS resource set. The PRS resources 512 and 514 are repeated every $T_{PRS}$ subframes up to the muting sequence periodicity $T_{REP}$. As such, a bitmap of length $T_{REP}$ would be needed to indicate which occasions of instances 530a, 530b, and 530c are muted (i.e., not transmitted).

In an aspect, there may be additional constraints on a PRS configuration, such as PRS configuration 500 illustrated in FIG. 5. For example, for all PRS resources (e.g., PRS resources 512, 514) of a PRS resource set (e.g., PRS resource set 510), the base station can configure the following parameters to be the same: (a) the occasion length (e.g., $T_{PRS}$), (b) the number of symbols (e.g., $N_{symb}$), (c) the comb type, and/or (d) the bandwidth. In addition, for all PRS resources of all PRS resource sets, the subcarrier spacing and the cyclic prefix can be configured to be the same for one base station or for all base stations. Whether it is for one base station or all base stations may depend on the UE's capability to support the first and/or second option.

In some cases, a base station may need to trigger a UE to perform measurements of PRS transmitted on one or more PRS resources, one or more PRS resource sets, one or more positioning frequency layers, and/or one or more TRPs. In such cases, the PRS signaling described above may be inefficient and result in increased overhead expenditures at the base station, excessive power consumption at the UE, and reduced flexibility. For example, an LMF (e.g., LMF 270) may configure a UE with resources for uplink and/or downlink PRS signaling. However, the LMF may configure the UE with downlink resources via higher layer signaling (e.g., LPP signaling), but the higher layer signaling for the PRS configuration may increase system latency, and may not be sufficiently flexible for efficient aperiodic PRS (e.g., on-demand PRS).

In such cases, the present disclosure provides techniques for a serving base station (or more specifically, a serving TRP/cell) to perform on-demand PRS signaling. For example, a serving base station may reduce system latency by initiating PRS monitoring at a UE via a dynamic trigger (instead of configuring PRS monitoring occasions via higher layer signaling, such as RRC signaling). The trigger may be transmitted in DCI to the UE and identify the particular PRS resource(s), PRS resource set(s), positioning frequency layer(s), and/or TRP(s) that the UE should measure.

In an aspect, a DCI code point may be explicitly associated with the triggering of one or more uniquely identified PRS resources. The triggered PRS resource(s) could span across one or more PRS resource sets of one or more TRPs, within, however, only one positioning frequency layer. More specifically, as described above, a PRS resource set is a collection of PRS resources and is associated with one TRP, and a positioning frequency layer is a collection of one or more PRS resource sets associated with one or more TRPs. Thus, for example, a single PRS resource may be associated with multiple PRS resource sets, and those multiple PRS resource sets may be associated with multiple TRPs. However, the PRS resource will be within only one positioning frequency layer because the PRS resource set(s) to which it belongs are only within one positioning frequency layer.

To enable the identification of a particular PRS resource within one PRS resource set of one TRP, regardless of whether or not the same PRS resource is associated with another PRS resource set and/or TRP, the DCI may include a triplet consisting of {PRS-ID, DL-PRS-ResourceSetId, DL-PRS-ResourceId}. The configuration of the DCI code points may contain one association for each DCI code point to a list of one or more triplets of {PRS-ID, DL-PRS-ResourceSetId, DL-PRS-ResourceId}. That is, a given DCI code point may be associated with a single triplet of {PRS-ID, DL-PRS-ResourceSetId, DL-PRS-ResourceId} or to multiple triplets of {PRS-ID, DL-PRS-ResourceSetId, DL-PRS-ResourceId}. Thus, a specific DCI code point may explicitly trigger one or more PRS resources. Note that a DCI code point is a field of a DCI payload that takes a specific value. For example, if the field is three bits, the DCI code point can take the values of 000 to 111 for a total of eight values.

Alternatively, the configuration of a PRS resource may contain a field of one or more associated DCI code point value(s). In this case, when the UE receives a PRS resource configuration, it can look up the DCI code point value(s) in the PRS resource configuration to determine if the configured PRS resource is being triggered. However, PRS resources of different positioning frequency layers may not be associated with the same value of the DCI code point. If PRS resources of different positioning frequency layers were associated with the same DCI code point, the UE, by receiving only one DCI code point, would be triggered to measure PRS on multiple frequency layers, which requires higher complexity for the UE. As such, PRS resources on different frequency layers should not be associated with the same value of the DCI code point by default. However, whether a UE is expecting the same value of a DCI code point to trigger PRS resources across frequency layers may be based on the UE's capabilities.

In an aspect, a DCI code point may be explicitly associated with the triggering of one or more PRS resource sets. In this case, all PRS resources of the triggered PRS resource set(s) would be triggered whenever the DCI field has the specific DCI code point value. As a first option, the triggered PRS resource sets may be from a single positioning frequency layer. As a second option, the triggered PRS resource sets may be from multiple positioning frequency layers. The second option may be based on the UE's capability to process PRS resource sets across frequency layers, and may be signaled to the network (e.g., during an LPP session).

To enable identification of a particular PRS resource set, the configuration of the DCI code points may contain one association for each DCI code point to a list of one or more tuples consisting of {PRS-ID, DL-PRS-ResourceSetId}. That is, a given DCI code point may be associated with a single tuple of {PRS-ID, DL-PRS-ResourceSetId} or to multiple tuples of {PRS-ID, DL-PRS-ResourceSetId}. Thus, a specific DCI code point may explicitly trigger one or more PRS resource sets.

Alternatively, the configuration of a PRS resource set may contain a field of one or more associated DCI code point value(s). In this case, when the UE receives a PRS resource set configuration, it can look up the DCI code point value(s) in the PRS resource set configuration to determine if the configured PRS resource set is being triggered. However, PRS resource sets of different frequency layers should not be associated with the same DCI code point by default (because it would require higher complexity for the UE). However, as with PRS resources across frequency layers, whether a UE is expecting the same value of a DCI code point to trigger PRS resource sets across frequency layers may be based on the UE's capabilities.

In an aspect, a DCI code point may be explicitly associated with the triggering of one or more positioning frequency layers. In this case, all PRS resources of all PRS resource sets of all TRPs operating on the triggered positioning frequency layer would be triggered whenever the DCI field has the specific DCI code point value. To enable identification of a particular positioning frequency layer, the configuration of the DCI code points could contain one association for each DCI code point to a list of one or more positioning frequency layer IDs. That is, a given DCI code point could be associated with a single positioning frequency layer ID or to multiple positioning frequency layer IDs. Thus, a specific DCI code point could explicitly trigger one or more positioning frequency layers.

Alternatively, the configuration of a positioning frequency layer could contain a field of one or more associated DCI code point value(s). In this case, when the UE receives a positioning frequency layer configuration, it can look up the DCI code point value(s) in the positioning frequency layer configuration to determine if the configured positioning frequency layer is being triggered. Because one DCI code point could be used to trigger one or multiple positioning frequency layers, all PRS resources of the associated frequency layers would be triggered.

In an aspect, a DCI code point may be explicitly associated with the triggering of one or more PRS-IDs. In this case, all PRS resources of all PRS resource sets of all the positioning frequency layers associated with the specified PRS-ID would be triggered whenever the DCI field has the specific DCI code point value. That is, a single DCI code point would trigger all of the PRS resources of all of the PRS resource sets of all of the positioning frequency layers of a given cell/TRP. As such, the DCI code point can be considered as being associated with a given cell/TRP. To enable the identification of a particular cell/TRP, the configuration of the DCI code points may contain one association for each DCI code point to a list of one or more PRS-ID(s). That is, a given DCI code point may be associated with a single PRS-ID or to multiple PRS-IDs. Thus, a specific DCI code point may explicitly trigger one or more PRS-ID.

Alternatively, the configuration of any of the approaches described above may be modified such that, whenever a DCI code point is used, only PRS resources and/or PRS resource sets associated with a specific PRS-ID are triggered. The specific PRS-ID may be signaled to the UE or known by convention (e.g., the PRS-ID associated with the serving TRP or a reference TRP or neighboring TRPs).

In an aspect, whether a DCI code point is associated with a particular PRS resource (via an association of the DCI code point with a set of {PRS-ID, DL-PRS-ResourceSetId, DL-PRS-ResourceId}), a particular PRS resource set (via an association of the DCI code point with a set of {PRS-ID, DL-PRS-ResourceSetId}), a particular positioning frequency layer (via an association of the DCI code point with a frequency layer ID), or a particular cell/TRP (via an association of the DCI code point with a PRS-ID) may be configurable by, for example, the involved cell/TRP or the location server. Alternatively, it may be specified in the applicable wireless communications standard. Alternatively or additionally, it may be based on the UE's capabilities, which may be signaled to the network (e.g., serving cell/TRP or location server). Thus, when a UE receives a particular DCI code point value, it will know if the code point value is referencing a PRS resource, a PRS resource set, a cell/TRP (via PRS-ID), or a positioning frequency layer, and it will be able to look up (e.g., in a locally stored lookup table) which PRS resource(s), PRS resource set(s), cell(s)/TRP(s), and/or positioning frequency layer(s) are being triggered.

In an aspect, the association between a DCI code point and one or more PRS resources, one or more PRS resource sets, one or more cells/TRPs, or one or more positioning frequency layers does not have to be an explicit identification of the one or more PRS resources, the one or more PRS resource sets, the one or more cells/TRPs, or the one or more positioning frequency layers. Rather, the DCI code point may specify a start position and a size/length of PRS resources, PRS resource sets, positioning frequency layers, and cells/TRPs to be triggered. For example, a DCI code point may not be associated with a specific DL-PRS-ResourceId, but rather, may indicate a particular start point and length of a PRS resource, and any PRS resources that meet this criteria would be triggered by the DCI code point.

Note that a slot offset with respect to the DCI is needed for the UE to determine the relevance of a DCI trigger (otherwise it would consider the DCI trigger to apply indefinitely). This is why a PRS configuration by itself may not be enough, and the UE may need the DCI trigger information to know when the PRS are being transmitted.

In an aspect, different values of a DCI code point may trigger different types of resources, rather than different values of a DCI code point triggering different instances of the same type of resource. For example, a first value of a DCI code point may trigger one or more PRS resources, a second value of the code point may trigger one or more PRS resource sets, a third value of the code point may trigger one or more positioning frequency layers, a fourth value of the code point may trigger one or more TRPs, or any combination thereof. In an aspect, whether different values of a DCI code point trigger different types of resources may be based on the capabilities of the UE.

In an aspect, the capabilities of the UE may be based on the frequency range (e.g., FR1 or FR2) or frequency band (e.g., narrowband, wideband) in which the UE is expected to measure PRS. That is, the UE may have different capabilities to measure PRS depending on the frequency range and/or frequency band in which it is measuring the PRS.

Because a DCI code point can trigger a set of PRS resources, and because some of the triggered PRS resources can be in different frequency layers, a measurement gap may also be triggered to enable the UE to measure the PRS resources on different frequency layers. Accordingly, the DCI code point that triggers particular PRS resources may also (jointly) trigger a measurement gap if it is expected that the UE will need to perform inter-frequency measurements. In an aspect, a DCI code point may be associated with a "floating" measurement gap with respect to the triggered PRS resource(s), PRS resource set(s), positioning frequency layer(s), or cell(s)/TRP(s). That is, the DCI code point may indicate (explicitly or implicitly) that there will be a measurement gap beginning some number of symbols before each PRS resource of the triggered PRS resource(s), PRS resource set(s), positioning frequency layer(s), or cell(s)/TRP(s) and ending some number of symbols after each PRS resource. For example, the measurement gap may begin one symbol before a PRS resource and end one symbol after the PRS resource.

In an aspect, the configuration of the DCI code points may contain an explicit association for one or more DCI code points indicating whether or not the identified code points jointly trigger a measurement gap. Alternatively, there may be an implicit indication that there will be a measurement gap based on the UE being expected to perform inter-frequency measurements. That is, if a code point triggers PRS resources in different frequency layers, it may be considered as jointly triggering a measurement gap to enable the UE to perform the inter-frequency measurements. The length of the measurement gap may be specified in the applicable wireless communications standard or signaled to the UE by the involved TRP(s) or the location server.

In an aspect, a common DCI may be defined for a group of UEs. Such a common DCI may be associated with a radio network temporary identifier (RNTI) and contain payload blocks. In each payload block, PRS may be triggered based on any of the techniques described above by a PRS indicator. That is, a PRS indicator in a payload block may trigger a set of one or more PRS resources, a set of one or more PRS resource sets, a set of one or more positioning frequency layers, or a set of one or more TRPs/cells. A payload block may include one or more PRS indicators, and each PRS indicator may be associated with a particular group of UEs. If a measurement gap is also triggered, this may be signaled in a second set of payload blocks, or within the same set of payload blocks as the PRS are triggered.

FIG. 6 illustrates an example method 600 of wireless communication, according to aspects of the disclosure. In an aspect, method 600 may be performed by a UE (e.g., any of the UEs described herein).

At 610, the UE receives, from a serving TRP (e.g., a TRP of any of the base stations described herein), DCI triggering the UE to measure PRS. In an aspect, a code point in the DCI is associated with one or more PRS resources, one or more PRS resource sets, one or more positioning frequency layers, or one or more TRPs. In an aspect, operation 610 may be performed by WWAN transceiver 310, processing system 332, memory component 340, and/or positioning component 342, any or all of which may be considered means for performing this operation.

At 620, the UE measures PRS transmitted on the one or more PRS resources, the one or more PRS resource sets, the one or more positioning frequency layers, or the one or more TRPs. In an aspect, operation 620 may be performed by WWAN transceiver 310, processing system 332, memory component 340, and/or positioning component 342, any or all of which may be considered means for performing this operation.

Figure 7:
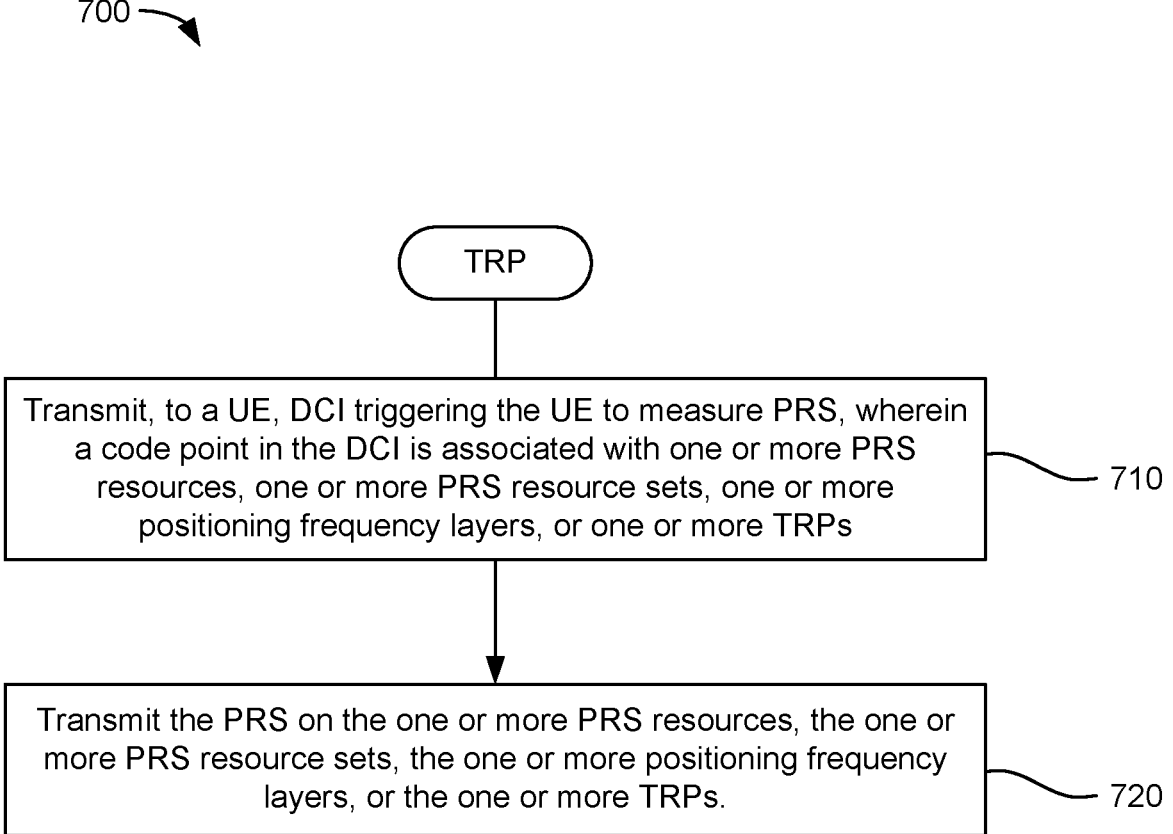

FIG. 7 illustrates an example method 700 of wireless communication, according to aspects of the disclosure. In an aspect, method 700 may be performed by a TRP (e.g., a TRP of any of the base stations described herein).

At 710, the TRP transmits, to a UE (e.g., any of the UEs described herein), DCI triggering the UE to measure PRS. In an aspect, a code point in the DCI is associated with one or more PRS resources, one or more PRS resource sets, one or more positioning frequency layers, or one or more TRPs. In an aspect, operation 710 may be performed by WWAN transceiver 350, processing system 384, memory component 386, and/or positioning component 388, any or all of which may be considered means for performing this operation.

At 720, the TRP transmits the PRS on the one or more PRS resources, the one or more PRS resource sets, the one or more positioning frequency layers, or the one or more TRPs. In an aspect, operation 720 may be performed by WWAN transceiver 350, processing system 384, memory component 386, and/or positioning component 388, any or all of which may be considered means for performing this operation.

As will be appreciated, technical advantages of the methods 600 and 700 include decreased signaling overhead, reduced power consumption at the UE, and increased flexibility.

Implementation examples are described in the following numbered clauses:

Clause 1. A method of wireless communication performed by a user equipment (UE), comprising: receiving, from a serving transmission-reception point (TRP), downlink control information (DCI) triggering the UE to measure positioning reference signals (PRS), wherein a code point in the DCI is associated with one or more PRS resources, one or more PRS resource sets, one or more positioning frequency layers, or one or more TRPs; and measuring PRS transmitted on the one or more PRS resources, the one or more PRS resource sets, the one or more positioning frequency layers, or the one or more TRPs.

Clause 2. The method of clause 1, wherein: the code point is associated with one or more triplets, each triplet consisting of a TRP-to-PRS resource set identifier, a PRS resource set identifier, and a PRS resource identifier, each triplet is used to trigger one PRS resource, and the measuring comprises measuring all PRS transmitted on all PRS resources of each PRS resource set of the one or more triplets.

Clause 3. The method of clause 2, wherein the TRP-to-PRS resource set identifier is defined such that it is associated with one or more downlink PRS resource sets from the same TRP.

Clause 4. The method of any of clauses 1-3, wherein a field of a configuration of the one or more PRS resources contains the code point.

Clause 5. The method of any of clauses 1-3, wherein a field of a configuration of the one or more PRS resource sets contains the code point.

Clause 6. The method of any of clauses 1-3, wherein a field of a configuration of the one or more positioning frequency layers contains the code point.

Clause 7. The method of any of clauses 1 and 3-6, wherein: the code point is associated with one or more tuples consisting of a TRP-to-PRS resource set identifier and a PRS resource set identifier, each tuple is used to trigger one or more PRS resource sets, and the measuring comprises measuring all PRS transmitted on all PRS resources of each PRS resource set of the one or more tuples.

Clause 8. The method of any of clauses 1 and 3-6, wherein: the code point is associated with one or more tuples consisting of a PRS resource set identifier and a PRS resource identifier, each tuple is used to trigger one PRS resource, and the measuring comprises measuring all PRS transmitted on all PRS resources of each PRS resource set of each of the one or more tuples.

Clause 9. The method of clause 8, wherein all PRS transmitted on all PRS resources of each of the one or more PRS resource sets are transmitted from one TRP.

Clause 10. The method of clause 9, wherein the one TRP is the serving TRP for the UE.

Clause 11. The method of any of clauses 1 and 3-6, wherein: the code point is associated with one or more PRS resource set identifiers, each PRS resource set identifier is used to trigger one PRS resource set, and the measuring comprises measuring all PRS transmitted on all PRS resources of each of the one or more PRS resource sets.

Clause 12. The method of clause 11, wherein all PRS transmitted on all PRS resources of the one or more PRS resource sets are transmitted from one TRP.

Clause 13. The method of clause 12, wherein the one TRP is the serving TRP for the UE.

Clause 14. The method of any of clauses 1 and 3-6, wherein: the code point is associated with one or more identifiers of the one or more positioning frequency layers, and the measuring comprises measuring all PRS transmitted on all PRS resources of all PRS resource sets of the one or more positioning frequency layers.

Clause 15. The method of any of clauses 1 and 3-6, wherein: the code point is associated with one or more TRP-to-PRS resource set identifiers of the one or more TRPs, and the measuring comprises measuring all PRS transmitted on all PRS resources of all PRS resource sets of a positioning frequency layer of the one or more TRPs.

Clause 16. The method of any of clauses 1-15, wherein whether or not the code point is associated with one or more PRS resources, one or more PRS resource sets, one or more positioning frequency layers, or one or more TRPs is based on capabilities of the UE.

Clause 17 The method of any of clauses 1-16, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

Clause 18. The method of clause 17, wherein the first value, the second value, the third value, and the fourth value triggering the one or more PRS resources, the one or more PRS resource sets, the one or more positioning frequency layers, and the one or more TRPs is based on capabilities of the UE.

Clause 19. The method of clause 18, wherein the capabilities of the UE are frequency range specific or frequency band specific.

Clause 20. The method of any of clauses 1-19, wherein: the code point is used to trigger a plurality of PRS resources spanning one or more positioning frequency layers, and the code point is further associated with a measurement gap for the plurality of PRS resources based on the plurality of PRS resources spanning the one or more positioning frequency layers.

Clause 21. The method of clause 20, wherein the association of the code point to the measurement gap is implicit based on the plurality of PRS resources spanning the one or more positioning frequency layers.

Clause 22. The method of clause 20, wherein the association of the code point to the measurement gap is explicitly configured to the UE by the serving TRP or a location server.

Clause 23. The method of any of clauses 20-22, wherein the measurement gap comprises a plurality of symbols starting one or more symbols before each PRS resource of the plurality of PRS resources and ending one or more symbols after each PRS resource of the plurality of PRS resources.

Clause 24. The method of any of clauses 1-23, wherein the DCI is common to a group of UEs, including the UE.

Clause 25. The method of clause 24, wherein the DCI includes a plurality of payload blocks, each of the plurality of payload blocks including one or more PRS indicators, each of the PRS indicators associated with a UE or a group of UEs.

Clause 26. The method of clause 25, wherein each PRS indicator triggers the associated UE or group of UEs to measure PRS on a set of one or more PRS resources, a set of one or more PRS resource sets, a set of one or more positioning frequency layers, a set of one or more TRPs, or any combination thereof.

Clause 27. The method of clause 26, wherein a second plurality of payload blocks includes indicators for measurement gaps for inter-frequency measurements of the PRS on the set of one or more PRS resources, the set of one or more PRS resource sets, the set of one or more positioning frequency layers, the set of one or more TRPs, or any combination thereof.

Clause 28. A method of wireless communication performed by a transmission-reception point (TRP), comprising: transmitting, to a user equipment (UE), downlink control information (DCI) triggering the UE to measure positioning reference signals (PRS), wherein a code point in the DCI is associated with one or more PRS resources, one or more PRS resource sets, one or more positioning frequency layers, or one or more TRPs; and transmitting the PRS on the one or more PRS resources, the one or more PRS resource sets, the one or more positioning frequency layers, or the one or more TRPs.

Clause 29. The method of clause 28, wherein: the code point is associated with one or more triplets, each triplet consisting of a TRP-to-PRS resource set identifier, a PRS resource set identifier, and a PRS resource identifier, and each triplet is used to trigger one PRS resource.

Clause 30. The method of clause 29, wherein the TRP-to-PRS resource set identifier is defined such that it is associated with one or more downlink PRS resource sets from the same TRP.

Clause 31. The method of any of clauses 28-30, wherein a field of a configuration of the one or more PRS resources contains the code point.

Clause 32. The method of any of clauses 28-30, wherein a field of a configuration of the one or more PRS resource sets contains the code point.

Clause 33. The method of any of clauses 28-30, wherein a field of a configuration of the one or more positioning frequency layers contains the code point.

Clause 34. The method of any of clauses 28 and 30-33, wherein: the code point is associated with one or more tuples consisting of a TRP-to-PRS resource set identifier and a PRS resource set identifier, and each tuple is used to trigger one or more PRS resource sets.

Clause 35. The method of any of clauses 28 and 30-33, wherein: the code point is associated with one or more tuples consisting of a PRS resource set identifier and a PRS resource identifier, and each tuple is used to trigger one PRS resource.

Clause 36. The method of clause 35, wherein all PRS transmitted on all PRS resources of each of the one or more PRS resource sets are transmitted from one TRP.

Clause 37. The method of clause 36, wherein the one TRP is a serving TRP for the UE.

Clause 38. The method of any of clauses 28 and 30-33, wherein: the code point is associated with one or more PRS resource set identifiers, and each PRS resource set identifier is used to trigger one PRS resource set.

Clause 39. The method of clause 38, wherein all PRS transmitted on all PRS resources of the one or more PRS resource sets are transmitted from one TRP.

Clause 40. The method of clause 39, wherein the one TRP is a serving TRP for the UE.

Clause 41. The method of any of clauses 28 and 30-33, wherein: the code point is associated with one or more identifiers of the one or more positioning frequency layers to trigger the UE to measure all PRS transmitted on all PRS resources of all PRS resource sets of the one or more positioning frequency layers.

Clause 42. The method of any of clauses 28 and 30-33, wherein: the code point is associated with one or more TRP-to-PRS resource set identifiers of the one or more TRPs to trigger the UE to measure all PRS transmitted on all PRS resources of all PRS resource sets of a positioning frequency layer of the one or more TRPs.

Clause 43. The method of any of clauses 28-42, wherein whether or not the DCI code point is associated with one or more PRS resources, one or more PRS resource sets, one or more positioning frequency layers, or one or more TRPs is based on capabilities of the UE.

Clause 44 The method of any of clauses 28-43, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

Clause 45. The method of clause 44, wherein the first value, the second value, the third value, and the fourth value triggering the one or more PRS resources, the one or more PRS resource sets, the one or more positioning frequency layers, and the one or more TRPs is based on capabilities of the UE.

Clause 46. The method of clause 45, wherein the capabilities of the UE are frequency range specific or frequency band specific.

Clause 47. The method of any of clauses 28-46, wherein: the code point is used to trigger a plurality of PRS resources spanning one or more positioning frequency layers, and the code point is further associated with a measurement gap for the plurality of PRS resources based on the plurality of PRS resources spanning the one or more positioning frequency layers.

Clause 48. The method of clause 47, wherein the association of the code point to the measurement gap is implicit based on the plurality of PRS resources spanning the one or more positioning frequency layers.

Clause 49. The method of clause 47, wherein the association of the code point to the measurement gap is explicitly configured to the UE by a serving TRP or a location server.

Clause 50. The method of any of clauses 47-49, wherein the measurement gap comprises a plurality of symbols starting one or more symbols before each PRS resource of the plurality of PRS resources and ending one or more symbols after each PRS resource of the plurality of PRS resources.

Clause 51. The method of any of clauses 28-50, wherein the DCI is common to a group of UEs, including the UE.

Clause 52. The method of clause 51, wherein the DCI includes a plurality of payload blocks, each of the plurality of payload blocks including one or more PRS indicators, each of the PRS indicators associated with a UE or a group of UEs.

Clause 53. The method of clause 52, wherein each PRS indicator triggers the associated UE or group of UEs to measure PRS on a set of one or more PRS resources, a set of one or more PRS resource sets, a set of one or more positioning frequency layers, a set of one or more TRPs, or any combination thereof.

Clause 54. The method of clause 53, wherein a second plurality of payload blocks includes indicators for measurement gaps for inter-frequency measurements of the PRS on the set of one or more PRS resources, the set of one or more PRS resource sets, the set of one or more positioning frequency layers, the set of one or more TRPs, or any combination thereof.

Clause 55. The method of any of clauses 28-54, further comprising: receiving, from a location server or a serving TRP, a command to trigger the UE to measure the PRS.

Clause 56. A user equipment (UE), comprising: a memory; at least one transceiver; and at least one processor communicatively coupled to the memory and the at least one transceiver, the at least one processor configured to: receive, from a serving transmission-reception point (TRP) via the at least one transceiver, downlink control information (DCI) triggering the UE to measure positioning reference signals (PRS), wherein a code point in the DCI is associated with one or more PRS resources, one or more PRS resource sets, one or more positioning frequency layers, or one or more TRPs; and measure PRS transmitted on the one or more PRS resources, the one or more PRS resource sets, the one or more positioning frequency layers, or the one or more TRPs.

Clause 57. The UE of clause 56, wherein: the code point is associated with one or more triplets, each triplet consisting of a TRP-to-PRS resource set identifier, a PRS resource set identifier, and a PRS resource identifier, each triplet is used to trigger one PRS resource, and the at least one processor being configured to measure comprises the at least one processor being configured to measure all PRS transmitted on all PRS resources of each PRS resource set of the one or more triplets.

Clause 58. The UE of clause 57, wherein the TRP-to-PRS resource set identifier is defined such that it is associated with one or more downlink PRS resource sets from the same TRP.

Clause 59. The UE of any of clauses 56-58, wherein a field of a configuration of the one or more PRS resources contains the code point.

Clause 60. The UE of any of clauses 56-58, wherein a field of a configuration of the one or more PRS resource sets contains the code point.

Clause 61. The UE of any of clauses 56-58, wherein a field of a configuration of the one or more positioning frequency layers contains the code point.

Clause 62. The UE of any of clauses 56 and 58-61, wherein: the code point is associated with one or more tuples consisting of a TRP-to-PRS resource set identifier and a PRS resource set identifier, each tuple is used to trigger one or more PRS resource sets, and the at least one processor being configured to measure comprises the at least one processor being configured to measure all PRS transmitted on all PRS resources of each PRS resource set of the one or more tuples.

Clause 63. The UE of any of clauses 56 and 58-61, wherein: the code point is associated with one or more tuples consisting of a PRS resource set identifier and a PRS resource identifier, each tuple is used to trigger one PRS resource, and the measuring comprises measuring all PRS transmitted on all PRS resources of each PRS resource set of each of the one or more tuples.

Clause 64. The UE of clause 63, wherein all PRS transmitted on all PRS resources of each of the one or more PRS resource sets are transmitted from one TRP.

Clause 65. The UE of clause 64, wherein the one TRP is the serving TRP for the UE.

Clause 66. The UE of any of clauses 56 and 58-61, wherein: the code point is associated with one or more PRS resource set identifiers, each PRS resource set identifier is used to trigger one PRS resource set, and the measuring comprises measuring all PRS transmitted on all PRS resources of each of the one or more PRS resource sets.

Clause 67. The UE of clause 66, wherein all PRS transmitted on all PRS resources of the one or more PRS resource sets are transmitted from one TRP.

Clause 68. The UE of clause 67, wherein the one TRP is the serving TRP for the UE.

Clause 69. The UE of any of clauses 56 and 58-61, wherein: the code point is associated with one or more identifiers of the one or more positioning frequency layers, and the at least one processor being configured to measure comprises the at least one processor being configured to measure all PRS transmitted on all PRS resources of all PRS resource sets of the one or more positioning frequency layers.

Clause 70. The UE of any of clauses 56 and 58-61, wherein: the code point is associated with one or more TRP-to-PRS resource set identifiers of the one or more TRPs, and the at least one processor being configured to measure comprises the at least one processor being configured to measure all PRS transmitted on all PRS resources of all PRS resource sets of a positioning frequency layer of the one or more TRPs.

Clause 71. The UE of any of clauses 56-70, wherein whether or not the DCI code point is associated with one or more PRS resources, one or more PRS resource sets, one or more positioning frequency layers, or one or more TRPs is based on capabilities of the UE.

Clause 72 The UE of any of clauses 56-71, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

Clause 73. The UE of clause 72, wherein the first value, the second value, the third value, and the fourth value triggering the one or more PRS resources, the one or more PRS resource sets, the one or more positioning frequency layers, and the one or more TRPs is based on capabilities of the UE.

Clause 74. The UE of clause 73, wherein the capabilities of the UE are frequency range specific or frequency band specific.

Clause 75. The UE of any of clauses 56-74, wherein: the code point is used to trigger a plurality of PRS resources spanning one or more positioning frequency layers, and the code point is further associated with a measurement gap for the plurality of PRS resources based on the plurality of PRS resources spanning the one or more positioning frequency layers.

Clause 76. The UE of clause 75, wherein the association of the code point to the measurement gap is implicit based on the plurality of PRS resources spanning the one or more positioning frequency layers.

Clause 77. The UE of clause 75, wherein the association of the code point to the measurement gap is explicitly configured to the UE by the serving TRP or a location server.

Clause 78. The UE of any of clauses 75-77, wherein the measurement gap comprises a plurality of symbols starting one or more symbols before each PRS resource of the plurality of PRS resources and ending one or more symbols after each PRS resource of the plurality of PRS resources.

Clause 79. The UE of any of clauses 56-78, wherein the DCI is common to a group of UEs, including the UE.

Clause 80. The UE of clause 79, wherein the DCI includes a plurality of payload blocks, each of the plurality of payload blocks including one or more PRS indicators, each of the PRS indicators associated with a UE or a group of UEs.

Clause 81. The UE of clause 80, wherein each PRS indicator triggers the associated UE or group of UEs to measure PRS on a set of one or more PRS resources, a set of one or more PRS resource sets, a set of one or more positioning frequency layers, a set of one or more TRPs, or any combination thereof.

Clause 82. The UE of any of clauses 81, wherein a second plurality of payload blocks includes indicators for measurement gaps for inter-frequency measurements of the PRS on the set of one or more PRS resources, the set of one or more PRS resource sets, the set of one or more positioning frequency layers, the set of one or more TRPs, or any combination thereof.

Clause 83. A base station, comprising: a memory; at least one transceiver; and at least one processor communicatively coupled to the memory and the at least one transceiver, the at least one processor configured to: cause the at least one transceiver to transmit, to a user equipment (UE), downlink control information (DCI) triggering the UE to measure positioning reference signals (PRS), wherein a code point in the DCI is associated with one or more PRS resources, one or more PRS resource sets, one or more positioning frequency layers, or one or more TRPs; and cause the at least one transceiver to transmit the PRS on the one or more PRS resources, the one or more PRS resource sets, the one or more positioning frequency layers, or the one or more TRPs.

Clause 84. The base station of clause 83, wherein: the code point is associated with one or more triplets, each triplet consisting of a TRP-to-PRS resource set identifier, a PRS resource set identifier, and a PRS resource identifier, and each triplet is used to trigger one PRS resource.

Clause 85. The base station of clause 84, wherein the TRP-to-PRS resource set identifier is defined such that it is associated with one or more downlink PRS resource sets from the same TRP.

Clause 86. The base station of any of clauses 83-85, wherein a field of a configuration of the one or more PRS resources contains the code point.

Clause 87. The base station of any of clauses 83-85, wherein a field of a configuration of the one or more PRS resource sets contains the code point.

Clause 88. The base station of any of clauses 83-85, wherein a field of a configuration of the one or more positioning frequency layers contains the code point.

Clause 89. The base station of any of clauses 83 and 85-88, wherein: the code point is associated with one or more tuples consisting of a TRP-to-PRS resource set identifier and a PRS resource set identifier, and each tuple is used to trigger one or more PRS resource sets.

Clause 90. The base station of any of clauses 83 and 85-88, wherein: the code point is associated with one or more tuples consisting of a PRS resource set identifier and a PRS resource identifier, each tuple is used to trigger one PRS resource, and the measuring comprises measuring all PRS transmitted on all PRS resources of each PRS resource set of each of the one or more tuples.

Clause 91. The base station of clause 90, wherein all PRS transmitted on all PRS resources of each of the one or more PRS resource sets are transmitted from one TRP.

Clause 92. The base station of clause 91, wherein the one TRP is a serving TRP for the UE.

Clause 93. The base station of any of clauses 83 and 85-88, wherein: the code point is associated with one or more PRS resource set identifiers, each PRS resource set identifier is used to trigger one PRS resource set, and the measuring comprises measuring all PRS transmitted on all PRS resources of each of the one or more PRS resource sets.

Clause 94. The base station of clause 93, wherein all PRS transmitted on all PRS resources of the one or more PRS resource sets are transmitted from one TRP.

Clause 95. The method of clause 94, wherein the one TRP is a serving TRP for the UE.

Clause 96. The base station of any of clauses 83 and 85-88, wherein the code point is associated with one or more identifiers of the one or more positioning frequency layers to trigger the UE to measure all PRS transmitted on all PRS resources of all PRS resource sets of the one or more positioning frequency layers.

Clause 97. The base station of any of clauses 83 and 85-88, wherein the code point is associated with one or more TRP-to-PRS resource set identifiers of the one or more TRPs to trigger the UE to measure all PRS transmitted on all PRS resources of all PRS resource sets of a positioning frequency layer of the one or more TRPs.

Clause 98. The base station of any of clauses 83-97, wherein whether or not the DCI code point is associated with one or more PRS resources, one or more PRS resource sets, one or more positioning frequency layers, or one or more TRPs is based on capabilities of the UE.

Clause 99 The base station of any of clauses 83-98, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

Clause 100. The base station of clause 99, wherein the first value, the second value, the third value, and the fourth value triggering the one or more PRS resources, the one or more PRS resource sets, the one or more positioning frequency layers, and the one or more TRPs is based on capabilities of the UE.

Clause 101. The base station of clause 100, wherein the capabilities of the UE are frequency range specific or frequency band specific.

Clause 102. The base station of any of clauses 83-101, wherein: the code point is used to trigger a plurality of PRS resources spanning multiple positioning frequency layers, and the code point is further associated with a measurement gap for the plurality of PRS resources based on the plurality of PRS resources spanning multiple positioning frequency layers.

Clause 103. The base station of clause 102, wherein the association of the code point to the measurement gap is implicit based on the plurality of PRS resources spanning multiple positioning frequency layers.

Clause 104. The base station of clause 102, wherein the association of the code point to the measurement gap is explicitly configured to the UE by a serving TRP or a location server.

Clause 105. The base station of any of clauses 102-104, wherein the measurement gap comprises a plurality of symbols starting one or more symbols before each PRS resource of the plurality of PRS resources and ending one or more symbols after each PRS resource of the plurality of PRS resources.

Clause 106. The base station of any of clauses 83-105, wherein the DCI is common to a group of UEs, including the UE.

Clause 107. The base station of clause 106, wherein the DCI includes a plurality of payload blocks, each of the plurality of payload blocks including one or more PRS indicators, each of the PRS indicators associated with a UE or a group of UEs.

Clause 108. The base station of clause 107, wherein each PRS indicator triggers the associated UE or group of UEs to measure PRS on a set of one or more PRS resources, a set of one or more PRS resource sets, a set of one or more positioning frequency layers, a set of one or more TRPs, or any combination thereof.

Clause 109. The base station of clause 108, wherein a second plurality of payload blocks includes indicators for measurement gaps for inter-frequency measurements of the PRS on the set of one or more PRS resources, the set of one or more PRS resource sets, the set of one or more positioning frequency layers, the set of one or more TRPs, or any combination thereof.

Clause 110. The base station of any of clauses 83-109, wherein the at least one processor is configured to: receive, from a location server or a serving TRP, a command to trigger the UE to measure the PRS.

Clause 111. An apparatus comprising means for performing a method according to any of clauses 1-55.

Clause 112. A non-transitory computer-readable medium storing computer-executable instructions, the computer-executable comprising at least one instruction for causing a computer or processor to perform a method according to any of clauses 1-55.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE), comprising:
    receiving, from a serving transmission-reception point (TRP), downlink control information (DCI) triggering the UE to measure positioning reference signals (PRS), wherein a code point in the DCI is associated with one or more PRS resources, one or more PRS resource sets, one or more positioning frequency layers, or one or more TRPs, and wherein the code point is associated with at least one or more TRP-to-PRS resource set identifiers of the one or more TRPs; and
    measuring PRS transmitted on the one or more PRS resources, the one or more PRS resource sets, the one or more positioning frequency layers, or the one or more TRPs, wherein the measuring comprises measuring all PRS transmitted on all PRS resources of at least one PRS resource set of the one or more PRS resource sets.

2. The method of claim 1, wherein:
    the code point is associated with one or more triplets, each triplet consisting of a TRP-to-PRS resource set identifier, a PRS resource set identifier, and a PRS resource identifier,
    each triplet is used to trigger one PRS resource, and
    the measuring comprises measuring all PRS transmitted on all PRS resources of each PRS resource set of the one or more triplets.

3. The method of claim 2, wherein the TRP-to-PRS resource set identifier is defined such that it is associated with one or more downlink PRS resource sets from the same TRP.

4. The method of claim 1, wherein:
    a field of a configuration of the one or more PRS resources contains the code point,
    a field of a configuration of the one or more PRS resource sets contains the code point, or
    a field of a configuration of the one or more positioning frequency layers contains the code point.

5. The method of claim 1, wherein:
    the code point is associated with one or more tuples consisting of a TRP-to-PRS resource set identifier and a PRS resource set identifier,
    each tuple is used to trigger one or more PRS resource sets, and
    the measuring comprises measuring all PRS transmitted on all PRS resources of each PRS resource set of the one or more tuples.

6. The method of claim 1, wherein:
    the code point is associated with one or more tuples consisting of a PRS resource set identifier and a PRS resource identifier,
    each tuple is used to trigger one PRS resource, and
    the measuring comprises measuring all PRS transmitted on all PRS resources of each PRS resource set of each of the one or more tuples.

7. The method of claim 6, wherein all PRS transmitted on all PRS resources of each of the one or more PRS resource sets are transmitted from one TRP.

8. The method of claim 1, wherein:
    the code point is associated with one or more PRS resource set identifiers,
    each PRS resource set identifier is used to trigger one PRS resource set, and
    the measuring comprises measuring all PRS transmitted on all PRS resources of each of the one or more PRS resource sets.

9. The method of claim 8, wherein all PRS transmitted on all PRS resources of the one or more PRS resource sets are transmitted from one TRP.

10. The method of claim 1, wherein:
    the code point is associated with one or more identifiers of the one or more positioning frequency layers, and
    the measuring comprises measuring all PRS transmitted on all PRS resources of all PRS resource sets of the one or more positioning frequency layers.

11. The method of claim 1, wherein:
    the measuring comprises measuring all PRS transmitted on all PRS resources of all PRS resource sets of a positioning frequency layer of the one or more TRPs.

12. The method of claim 1, wherein whether or not the code point is associated with one or more PRS resources, one or more PRS resource sets, one or more positioning frequency layers, or one or more TRPs is based on capabilities of the UE.

13. The method of claim 1, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

14. The method of claim 13, wherein the first value, the second value, the third value, and the fourth value triggering the one or more PRS resources, the one or more PRS resource sets, the one or more positioning frequency layers, and the one or more TRPs is based on capabilities of the UE.

15. The method of claim 1, wherein:
the code point is used to trigger a plurality of PRS resources spanning one or more positioning frequency layers, and
the code point is further associated with a measurement gap for the plurality of PRS resources based on the plurality of PRS resources spanning the one or more positioning frequency layers.

16. The method of claim 15, wherein the association of the code point to the measurement gap is implicit based on the plurality of PRS resources spanning the one or more positioning frequency layers.

17. The method of claim 15, wherein the association of the code point to the measurement gap is explicitly configured to the UE by the serving TRP or a location server.

18. The method of claim 1, wherein the DCI is common to a group of UEs, including the UE.

19. The method of claim 18, wherein the DCI includes a plurality of payload blocks, each of the plurality of payload blocks including one or more PRS indicators, each of the PRS indicators associated with a UE or a group of UEs.

20. The method of claim 19, wherein each PRS indicator triggers the associated UE or group of UEs to measure PRS on a set of one or more PRS resources, a set of one or more PRS resource sets, a set of one or more positioning frequency layers, a set of one or more TRPs, or any combination thereof.

21. The method of claim 20, wherein a second plurality of payload blocks includes indicators for measurement gaps for inter-frequency measurements of the PRS on the set of one or more PRS resources, the set of one or more PRS resource sets, the set of one or more positioning frequency layers, the set of one or more TRPs, or any combination thereof.

22. A method of wireless communication performed by a transmission-reception point (TRP), comprising:
transmitting, to a user equipment (UE), downlink control information (DCI) triggering the UE to measure positioning reference signals (PRS), wherein a code point in the DCI is associated with one or more PRS resources, one or more PRS resource sets, one or more positioning frequency layers, or one or more TRPs, wherein the code point is associated with at least one or more TRP-to-PRS resource set identifiers of the one or more TRPs to trigger the UE to measure all PRS transmitted on all PRS resources of at least one PRS resource set of the one or more PRS resource sets; and
transmitting the PRS on the one or more PRS resources, the one or more PRS resource sets, the one or more positioning frequency layers, or the one or more TRPs.

23. The method of claim 22, wherein:
the code point is associated with one or more triplets, each triplet consisting of a TRP-to-PRS resource set identifier, a PRS resource set identifier, and a PRS resource identifier, and
each triplet is used to trigger one PRS resource.

24. The method of claim 22, wherein:
a field of a configuration of the one or more PRS resources contains the code point,
a field of a configuration of the one or more PRS resource sets contains the code point, or
a field of a configuration of the one or more positioning frequency layers contains the code point.

25. The method of claim 22, wherein:
the code point is associated with one or more tuples consisting of a TRP-to-PRS resource set identifier and a PRS resource set identifier, and
each tuple is used to trigger one or more PRS resource sets.

26. The method of claim 22, wherein:
the code point is associated with one or more tuples consisting of a PRS resource set identifier and a PRS resource identifier, and
each tuple is used to trigger one PRS resource.

27. The method of claim 22, wherein:
the code point is associated with one or more PRS resource set identifiers, and
each PRS resource set identifier is used to trigger one PRS resource set.

28. The method of claim 22, wherein:
the code point is associated with one or more identifiers of the one or more positioning frequency layers to trigger the UE to measure all PRS transmitted on all PRS resources of all PRS resource sets of the one or more positioning frequency layers.

29. The method of claim 22, wherein:
the code point is associated with the one or more TRP-to-PRS resource set identifiers of the one or more TRPs to trigger the UE to measure all PRS transmitted on all PRS resources of all PRS resource sets of a positioning frequency layer of the one or more TRPs.

30. The method of claim 22, wherein whether or not the DCI code point is associated with one or more PRS resources, one or more PRS resource sets, one or more positioning frequency layers, or one or more TRPs is based on capabilities of the UE.

31. The method of claim 22, wherein a first value of the code point triggers the one or more PRS resources, a second value of the code point triggers the one or more PRS resource sets, a third value of the code point triggers the one or more positioning frequency layers, a fourth value of the code point triggers the one or more TRPs, or any combination thereof.

32. The method of claim 22, wherein:
the code point is used to trigger a plurality of PRS resources spanning one or more positioning frequency layers, and
the code point is further associated with a measurement gap for the plurality of PRS resources based on the plurality of PRS resources spanning the one or more positioning frequency layers.

33. A user equipment (UE), comprising:
one or more memories;
one or more transceivers; and
one or more processors communicatively coupled to the one or more memories and the one or more transceivers, the one or more processors, either alone or in combination, configured to:
receive, from a serving transmission-reception point (TRP) via the at least one transceiver, downlink control information (DCI) triggering the UE to measure positioning reference signals (PRS), wherein a code point in the DCI is associated with one or more PRS resources, one or more PRS resource sets, one or more positioning frequency layers, or one or more TRPs, and wherein the code point is associated with at least one or more TRP-to-PRS resource set identifiers of the one or more TRPs; and measure PRS transmitted on the one or more PRS resources, the one or more PRS resource sets, the one or more positioning frequency layers, or the one or more TRPs, wherein the one or more processors configured to measure the PRS transmitted on the one or more PRS resources comprises the one or more processors, either alone or in combination, configured to measure all PRS transmitted on all PRS resources of at least one PRS resource set of the one or more PRS resource sets.

34. A base station, comprising:

one or more memories;

one or more transceivers; and one or more processors communicatively coupled to the one or more memories and the one or more transceivers, the one or more processors, either alone or in combination, configured to:

transmit, via the one or more transceivers, to a user equipment (UE), downlink control information (DCI) triggering the UE to measure positioning reference signals (PRS), wherein a code point in the DCI is associated with one or more PRS resources, one or more PRS resource sets, one or more positioning frequency layers, or one or more TRPs, wherein the code point is associated with at least one or more TRP-to-PRS resource set identifiers of the one or more TRPs to trigger the UE to measure all PRS transmitted on all PRS transmitted on all PRS resources of at least one PRS resource set of the one or more PRS resource sets; and transmit, via the one or more transceivers, the PRS on the one or more PRS resources, the one or more PRS resource sets, the one or more positioning frequency layers, or the one or more TRPs.

35. A user equipment (UE), comprising:

means for receiving, from a serving transmission-reception point (TRP), downlink control information (DCI) triggering the UE to measure positioning reference signals (PRS), wherein a code point in the DCI is associated with one or more PRS resources, one or more PRS resource sets, one or more positioning frequency layers, or one or more TRPs, and wherein the code point is associated with at least one or more TRP-to-PRS resource set identifiers of the one or more TRPs; and means for measuring PRS transmitted on the one or more PRS resources, the one or more PRS resource sets, the one or more positioning frequency layers, or the one or more TRPs, wherein the means for measuring comprises means for measuring all PRS transmitted on all PRS resources of at least one PRS resource set of the one or more PRS resource sets.

\* \* \* \* \*